US012612502B2

(12) United States Patent
Yamamoto et al.

(10) Patent No.: US 12,612,502 B2
(45) Date of Patent: Apr. 28, 2026

(54) ADHESIVE TREATMENT LIQUID, AND METHOD FOR TREATING ADHESIVE

(71) Applicant: NITTO DENKO CORPORATION, Ibaraki (JP)

(72) Inventors: Akiyoshi Yamamoto, Ibaraki (JP); Takayuki Nomura, Ibaraki (JP); Takeshi Nishibe, Ibaraki (JP); Yosuke Yamada, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 641 days.

(21) Appl. No.: 18/013,148

(22) PCT Filed: Jun. 25, 2021

(86) PCT No.: PCT/JP2021/024220
§ 371 (c)(1),
(2) Date: Dec. 27, 2022

(87) PCT Pub. No.: WO2022/004609
PCT Pub. Date: Jan. 6, 2022

(65) Prior Publication Data
US 2023/0242732 A1 Aug. 3, 2023

(30) Foreign Application Priority Data
Jun. 30, 2020 (JP) ................................. 2020-112433

(51) Int. Cl.
*C08J 11/08* (2006.01)
*C09J 7/38* (2018.01)
(Continued)

(52) U.S. Cl.
CPC .............. *C08J 11/08* (2013.01); *C09J 7/385* (2018.01); *C09J 133/02* (2013.01); *C11D 7/06* (2013.01);
(Continued)

(58) Field of Classification Search
CPC ....................................................... C08J 11/08
See application file for complete search history.

(56) References Cited

U.S. PATENT DOCUMENTS

| | | | |
|---|---|---|---|
| 5,954,891 A | 9/1999 | Kondoh et al. | |
| 10,035,978 B2 | 7/2018 | Oie et al. | |
| 2017/0306273 A1 * | 10/2017 | Ueno ..................... | C09J 183/04 |

FOREIGN PATENT DOCUMENTS

| | | |
|---|---|---|
| CN | 106398913 A | 2/2017 |
| GB | 1134967 A | 11/1968 |

(Continued)

OTHER PUBLICATIONS

Office Action dated Sep. 27, 2024, issued in counterpart TW application No. 110123765, with English translation. (12 pages).
(Continued)

*Primary Examiner* — William D Young
(74) *Attorney, Agent, or Firm* — WHDA, LLP

(57) ABSTRACT

Provided are a pressure-sensitive adhesive treatment liquid, which can easily remove various kinds of pressure-sensitive adhesives, and a pressure-sensitive adhesive treatment method by which the various kinds of pressure-sensitive adhesives are easily removed. For example, when a pressure-sensitive adhesive tape including a base material and a pressure-sensitive adhesive is used as a treatment object, there are provided a pressure-sensitive adhesive treatment liquid, which can easily separate the base material and various kinds of pressure-sensitive adhesives from each other, and a pressure-sensitive adhesive treatment method by which the base material and the various kinds of pressure-sensitive adhesives are easily separated from each other. A pressure-sensitive adhesive treatment liquid according to an embodiment of the present invention is a treatment liquid for a pressure-sensitive adhesive, and includes a liquid having a Hansen solubility parameter value of 31 or less, and an
(Continued)

alkaline compound. The concentration of the alkaline compound is from 0.001 wt % to 20 wt %.

9 Claims, 2 Drawing Sheets

(51) Int. Cl.

| | |
|---|---|
| *C09J 133/02* | (2006.01) |
| *C11D 7/06* | (2006.01) |
| *C11D 7/50* | (2006.01) |

(52) U.S. Cl.
CPC ......... *C11D 7/5022* (2013.01); *C08J 2333/02* (2013.01); *C09J 2301/302* (2020.08); *C09J 2301/502* (2020.08); *C09J 2433/00* (2013.01)

(56) References Cited

FOREIGN PATENT DOCUMENTS

| | | |
|---|---|---|
| JP | H06-041592 A | 2/1994 |
| JP | H07-113067 A | 5/1995 |
| JP | H10-195492 A | 7/1998 |
| JP | H11-241053 A | 9/1999 |
| JP | H11-323280 A | 11/1999 |
| JP | 2000-102932 A | 4/2000 |
| JP | 2001-328849 A | 11/2001 |
| JP | 2002-317073 A | 10/2002 |
| JP | 2002-348558 A | 12/2002 |
| JP | 2003-292994 A | 10/2003 |
| JP | 2007-204706 A | 8/2007 |
| JP | 2011-231279 A | 11/2011 |
| JP | 2012-201748 A | 10/2012 |
| JP | 2017-197621 A | 11/2017 |
| JP | 2019-099734 A | 6/2019 |
| JP | 2021-160351 A | 10/2021 |
| KR | 10-2011-0018226 A | 2/2011 |

OTHER PUBLICATIONS

Office Action dated Mar. 14, 2023, issued in counterpart to JP Application No. 2023-023175, with English Translation. (9 pages).
Office Action dated Oct. 11, 2022, issued in counterpart to JP Application No. 2022-533965, with English Translation. (16 pages).
International Search Report dated Sep. 21, 2021, issued in counterpart International Application No. PCT/JP2021/024220.
Office Action dated Apr. 1, 2025, issued in counterpart EP Application No. 21832393.9. (5 pages).
Extended (Supplementary) European Search Report dated Jun. 5, 2024, issued in counterpart EP Application No. 21832393.9. (8 pages).
Office Action dated Jun. 27, 2025, issued in counterpart CN Application No. 202180045876.6, with English translation. (14 pages).
Office Action dated Dec. 31, 2025, issued in counterpart IN Application No. 202317003827. (7 pages).

* cited by examiner

ADHESIVE TREATMENT LIQUID, AND METHOD FOR TREATING ADHESIVE

TECHNICAL FIELD

The present invention relates to a pressure-sensitive adhesive treatment liquid. The present invention also relates to a pressure-sensitive adhesive treatment method.

BACKGROUND ART

A pressure-sensitive adhesive tape has been used in a large amount in, for example, the bonding of a label or the like to an article or a wrapping material, the packaging of a packaging material, a production process for an electronic member or an optical member, and a masking application. In particular, in recent years, the frequency at which the pressure-sensitive adhesive tape is used in the production process for the electronic member or the optical member has been increasing, and hence a large amount of pressure-sensitive adhesive tape waste has been produced in, for example, a production site.

Typically, the pressure-sensitive adhesive tape waste is subjected to waste treatment by being burnt, or is subjected to waste treatment by being brought into a waste disposal site. However, such waste treatment is not preferred from the viewpoint of a reduction in environmental load.

In view of the foregoing, such waste treatment for the pressure-sensitive adhesive tape waste as described above needs to be reduced to the extent possible. There has been desired an investigation on the recycling of a material for the pressure-sensitive adhesive tape serving as means for reducing such waste treatment for the pressure-sensitive adhesive tape waste. Examples of such material for the pressure-sensitive adhesive tape include a pressure-sensitive adhesive and a base material.

With regard to an acrylic pressure-sensitive adhesive to be incorporated into the pressure-sensitive adhesive tape, there is a report of a method including designing the composition of the acrylic pressure-sensitive adhesive to specific composition to separate the pressure-sensitive adhesive.

There is a report of a technology including re-macerating the pressure-sensitive adhesive layer of a pressure-sensitive adhesive tape in a process for the turning of the tape into regenerated pulp to make the tape recyclable (Patent Literature 1). In the technology, the composition of a pressure-sensitive adhesive for forming the pressure-sensitive adhesive layer is formed of an alkoxyalkyl (meth)acrylate (from 7 wt % to 30 wt %), a caprolactone adduct of (meth)acrylic acid (from 1 wt % to 15 wt %), a (meth)acrylic acid alkyl ester monomer having an alkyl group having 4 to 18 carbon atoms (from 20 wt % to 70 wt %), an ethylenically unsaturated carboxylic acid-containing monomer (from 7 wt % to 20 wt %), and a monomer copolymerizable with these components (from 1 wt % to 15 wt %), and the pressure-sensitive adhesive having the specific composition is prepared to enable the maceration of the layer in an aqueous solution of NaOH having a concentration of 18%.

There is a report of a technology including subjecting an adhesive for labeling to be suitably peeled at the time of the recycling of a plastic bottle to saponification treatment with an alkaline aqueous solution to detach the adhesive (Patent Literature 2). In the technology, a potentially swelling component (a random, block, or graft copolymer containing 35 wt % to 90 wt % of a lower alkyl ester of acrylic acid and/or maleic acid) is incorporated into the adhesive to enable the detachment of the adhesive through the saponification treatment with the alkaline aqueous solution or a solution obtained by adding methanol or ethanol to the solution.

There is a report of a technology including immersing a heat-sensitive pressure-sensitive adhesive label to be suitably peeled at the time of the recycling of a plastic bottle in a hot aqueous solvent at 60° C. or more to cause the pressure-sensitive adhesive of the label to self-peel (Patent Literature 3). In the technology, a heat-sensitive pressure-sensitive adhesive composition containing an acrylic acid ester copolymerized product as a polymer material, a heat-expanding agent, polyvinyl alcohol having a saponification degree of 95 mol % or more, and a cross-linking agent or a curing agent are incorporated into the pressure-sensitive adhesive to cause the pressure-sensitive adhesive to self-peel.

However, each of the technologies described in Patent Literatures 1 to 3 is a technology in which a specific acrylic pressure-sensitive adhesive designed to specific composition needs to be adopted, and is hence a technology applicable only to a pressure-sensitive adhesive tape including such specific acrylic pressure-sensitive adhesive.

Meanwhile, at the time of the development of a technology for the recycling of a material for a pressure-sensitive adhesive tape in order to reduce the amount of pressure-sensitive adhesive tape waste to be produced in a large amount in a production site or the like, the technology is required to be applicable to pressure-sensitive adhesive tapes including various kinds of pressure-sensitive adhesives.

In addition, the technology for the recycling of the material for the pressure-sensitive adhesive tape is also required to be capable of easily separating a base material and a pressure-sensitive adhesive for forming the pressure-sensitive adhesive tape from each other.

Meanwhile, in, for example, the case where a pressure-sensitive adhesive tape is used as a process material, the following is required: at the time of the peeling of the pressure-sensitive adhesive tape from an adherend having bonded thereto the pressure-sensitive adhesive tape, the peeling from the adherend can be performed without any adhesive residue of a pressure-sensitive adhesive in the pressure-sensitive adhesive tape on the adherend. However, at the time of the peeling of the pressure-sensitive adhesive tape from the adherend having bonded thereto the pressure-sensitive adhesive tape, the pressure-sensitive adhesive in the pressure-sensitive adhesive tape may be present as an adhesive residue on the adherend depending on various factors, such as the kind of the adherend, and the kind and use environment of the pressure-sensitive adhesive tape. In such cases, the pressure-sensitive adhesive present as the adhesive residue needs to be simply removed without any damage to the adherend. In, for example, a process for the assembly of an electronic part, when such adhesive residue as described above occurs, the pressure-sensitive adhesive present as the adhesive residue needs to be simply removed without any damage to the adherend.

In addition, in, for example, a polymerization step or an application step at the time of the production of a pressure-sensitive adhesive, the pressure-sensitive adhesive may adhere to a production device, such as a polymerization kettle, an application machine, or an application roll. Cleaning through the removal of the pressure-sensitive adhesive adhering to the production device, such as the polymerization kettle, the application machine, or the application roll, therefrom requires much labor and the like, and hence there has been required a method by which the pressure-sensitive adhesive adhering to the production device, such as the polymerization kettle, the application machine, or the application roll, can be easily removed therefrom.

CITATION LIST

Patent Literature

[PTL 1] JP 11-241053 A
[PTL 2] JP 11-323280 A
[PTL 3] JP 07-113067 A

SUMMARY OF INVENTION

Technical Problem

An object of the present invention is to provide a pressure-sensitive adhesive treatment liquid, which can easily remove various kinds of pressure-sensitive adhesives, and a pressure-sensitive adhesive treatment method by which the various kinds of pressure-sensitive adhesives are easily removed.

For example, when a pressure-sensitive adhesive tape including a base material and a pressure-sensitive adhesive is used as a treatment object, the above-mentioned object corresponds to the provision of a pressure-sensitive adhesive treatment liquid, which can easily separate the base material and various kinds of pressure-sensitive adhesives from each other, and a pressure-sensitive adhesive treatment method by which the base material and the various kinds of pressure-sensitive adhesives are easily separated from each other.

For example, when a pressure-sensitive adhesive present as an adhesive residue on an adherend is used as a treatment object, the above-mentioned object corresponds to the provision of a pressure-sensitive adhesive treatment liquid, which can easily separate various kinds of pressure-sensitive adhesives from the adherend, and a pressure-sensitive adhesive treatment method by which the various kinds of pressure-sensitive adhesives are easily separated from the adherend.

For example, when a pressure-sensitive adhesive adhering to a production device, such as a polymerization kettle, an application machine, or an application roll, in, for example, a polymerization step or an application step at the time of the production of the pressure-sensitive adhesive is used as a treatment object, the above-mentioned object corresponds to the provision of a pressure-sensitive adhesive treatment liquid, which can easily separate the pressure-sensitive adhesive from the production device, such as the polymerization kettle, the application machine, or the application roll, and a pressure-sensitive adhesive treatment method by which the pressure-sensitive adhesive is easily separated from the production device, such as the polymerization kettle, the application machine, or the application roll.

Solution to Problem

According to one embodiment of the present invention, there is provided a pressure-sensitive adhesive treatment liquid, which is a treatment liquid for a pressure-sensitive adhesive, including: a liquid having a Hansen solubility parameter value of 31 or less; and an alkaline compound, wherein a concentration of the alkaline compound is from 0.001 wt % to 20 wt %.

In one embodiment, the Hansen solubility parameter value is 28 or less.

In one embodiment, the Hansen solubility parameter value is 25 or less.

In one embodiment, the concentration of the alkaline compound is from 0.01 wt % to 10 wt %.

In one embodiment, the concentration of the alkaline compound is from 0.1 wt % to 1 wt %.

In one embodiment, the pressure-sensitive adhesive includes at least one kind selected from the group consisting of: an acrylic pressure-sensitive adhesive; a urethane-based pressure-sensitive adhesive; a rubber-based pressure-sensitive adhesive; and a silicone-based pressure-sensitive adhesive.

According to one embodiment of the present invention, there is provided a method of treating a pressure-sensitive adhesive with the pressure-sensitive adhesive treatment liquid according to the embodiment of the present invention, the method including impregnating the pressure-sensitive adhesive with the pressure-sensitive adhesive treatment liquid.

In one embodiment, the method further includes performing stirring under a state in which the pressure-sensitive adhesive is impregnated with the pressure-sensitive adhesive treatment liquid.

In one embodiment, the method further includes performing ultrasonic treatment under a state in which the pressure-sensitive adhesive is impregnated with the pressure-sensitive adhesive treatment liquid.

Advantageous Effects of Invention

According to the present invention, there can be provided the pressure-sensitive adhesive treatment liquid, which can easily remove various kinds of pressure-sensitive adhesives, and the pressure-sensitive adhesive treatment method by which the various kinds of pressure-sensitive adhesives are easily removed.

For example, when a pressure-sensitive adhesive tape including a base material and a pressure-sensitive adhesive is used as a treatment object, the above-mentioned effect corresponds to the fact that there can be provided the pressure-sensitive adhesive treatment liquid, which can easily separate the base material and various kinds of pressure-sensitive adhesives from each other, and the pressure-sensitive adhesive treatment method by which the base material and the various kinds of pressure-sensitive adhesives are easily separated from each other.

For example, when a pressure-sensitive adhesive present as an adhesive residue on an adherend is used as a treatment object, the above-mentioned effect corresponds to the fact that there can be provided the pressure-sensitive adhesive treatment liquid, which can easily separate various kinds of pressure-sensitive adhesives from the adherend, and the pressure-sensitive adhesive treatment method by which the various kinds of pressure-sensitive adhesives are easily separated from the adherend.

For example, when a pressure-sensitive adhesive adhering to a production device, such as a polymerization kettle, an application machine, or an application roll, in, for example, a polymerization step or an application step at the time of the production of the pressure-sensitive adhesive is used as a treatment object, the above-mentioned effect corresponds to the fact that there can be provided the pressure-sensitive adhesive treatment liquid, which can easily separate the pressure-sensitive adhesive from the production device, such as the polymerization kettle, the application machine, or the application roll, and the pressure-sensitive adhesive treatment method by which the pressure-sensitive adhesive is easily separated from the production device, such as the polymerization kettle, the application machine, or the application roll.

DESCRIPTION OF EMBODIMENTS

Figure 1:
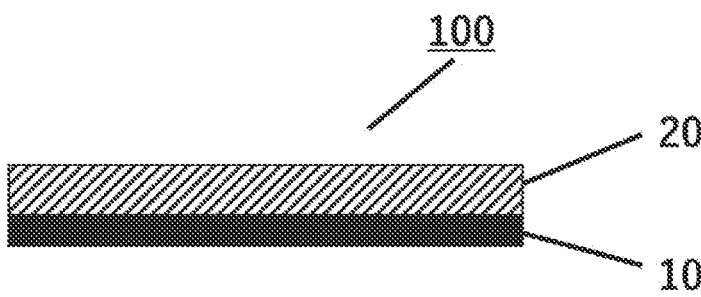
FIG. 1 is a schematic sectional view of one embodiment of a pressure-sensitive adhesive tape to which a pressure-sensitive adhesive treatment liquid and a pressure-sensitive adhesive treatment method according to embodiments of the present invention may be applied.

When the expression "weight" is used herein, the expression may be replaced with "mass" that has been commonly used as an SI unit for representing a weight.

When the expression "(meth)acrylic" is used herein, the expression means "acrylic and/or methacrylic", when the expression "(meth)acrylate" is used herein, the expression means "acrylate and/or methacrylate", when the expression "(meth)allyl" is used herein, the expression means "allyl and/or methallyl", and when the expression "(meth)acrolein" is used herein, the expression means "acrolein and/or methacrolein".

<<<<Pressure-Sensitive Adhesive Treatment Liquid>>>>

A pressure-sensitive adhesive treatment liquid according to an embodiment of the present invention is a treatment liquid for a pressure-sensitive adhesive. The pressure-sensitive adhesive treatment liquid according to the embodiment of the present invention can easily remove various kinds of pressure-sensitive adhesives.

In, for example, the case where a pressure-sensitive adhesive tape including a base material and a pressure-sensitive adhesive is used as a treatment object, the pressure-sensitive adhesive treatment liquid according to the embodiment of the present invention corresponds to a treatment liquid for the pressure-sensitive adhesive tape including the base material and the pressure-sensitive adhesive. In this case, the pressure-sensitive adhesive treatment liquid according to the embodiment of the present invention can easily separate the base material and various kinds of pressure-sensitive adhesives from each other. The pressure-sensitive adhesive tape serving as an example of the treatment object is described in detail later.

In, for example, the case where a pressure-sensitive adhesive present as an adhesive residue on an adherend is used as a treatment object, the pressure-sensitive adhesive treatment liquid according to the embodiment of the present invention corresponds to a pressure-sensitive adhesive treatment liquid that can easily separate various kinds of pressure-sensitive adhesives from the adherend. Any appropriate adherend may be adopted as the adherend in this case to the extent that the effects of the present invention are not impaired. Examples of such adherend include such adherends that a risk that a slight adhesive residue causes reductions in functions of the adherends is taken into consideration, the adherends including: electronic devices, such as a silicon wafer, a semiconductor circuit board, and a ceramic capacitor; and optical materials, such as an optical film and optical glass.

For example, when a pressure-sensitive adhesive adhering to a production device, such as a polymerization kettle, an application machine, or an application roll, in, for example, a polymerization step or an application step at the time of the production of the pressure-sensitive adhesive is used as a treatment object, the pressure-sensitive adhesive treatment liquid according to the embodiment of the present invention corresponds to a pressure-sensitive adhesive treatment liquid that can easily separate the pressure-sensitive adhesive from the production device, such as the polymerization kettle, the application machine, or the application roll.

The pressure-sensitive adhesive treatment liquid according to the embodiment of the present invention includes a liquid having a Hansen solubility parameter value of 31 or less, and an alkaline compound, and the concentration of the alkaline compound is from 0.001 wt % to 20 wt %.

The term "liquid" as used in the present invention refers to a product that is a liquid at normal temperature and normal pressure, and general examples thereof include water, an alcohol, and other various solvents.

The number of kinds of the liquids each having a Hansen solubility parameter value of 31 or less in the pressure-sensitive adhesive treatment liquid according to the embodiment of the present invention may be only one, or two or more.

The number of kinds of the alkaline compounds in the pressure-sensitive adhesive treatment liquid according to the embodiment of the present invention may be only one, or two or more.

The pressure-sensitive adhesive treatment liquid according to the embodiment of the present invention can easily remove various kinds of pressure-sensitive adhesives because the treatment liquid includes the liquid having a Hansen solubility parameter value of 31 or less, and the alkaline compound, and the concentration of the alkaline compound is from 0.001 wt % to 20 wt %.

The term "Hansen solubility parameter value" as used in the present invention refers to a parameter value obtained by dividing a Hildebrand solubility parameter value into three components, that is, a dispersion term ($\delta_D$), a polar term ($\delta_P$), and a hydrogen bond term ($\delta_H$), and considering the polarity of a substance, and may be abbreviated as "HSP value." The dispersion term (a term concerning a van der Waals force), the polar term (a term concerning a dipole moment), and the hydrogen bond term (a term concerning a hydrogen bond) may be represented with three-dimensional coordinates.

The Hansen solubility parameter value of a mixed liquid of two or more kinds of liquids may be determined from the following equation (1) as the weighted average "m" of the HSP values of the respective solvents:

$$m = \delta1\phi1 + \delta2\phi2 \tag{1}$$

where $\delta1$ and $\delta2$ represent the HSP values of the respective liquid components, and $\phi1$ and $\phi2$ represent the volume fractions of the respective liquid components.

The Hansen solubility parameter values of the respective solvents are recorded in "HSPiP version 5," and a value estimated from "HSPiP version 5" is used for a solvent that is not recorded therein.

In the pressure-sensitive adhesive treatment liquid according to the embodiment of the present invention, the Hansen solubility parameter value of the liquid in the pressure-sensitive adhesive treatment liquid is 31 or less, preferably 28 or less, more preferably 25 or less. In the pressure-sensitive adhesive treatment liquid according to the embodiment of the present invention, the lower limit of the Hansen solubility parameter value of the liquid in the pressure-sensitive adhesive treatment liquid is preferably 7 or more, more preferably 10 or more, still more preferably 13 or more. In the pressure-sensitive adhesive treatment liquid according to the embodiment of the present invention, when the Hansen solubility parameter value of the liquid in the pressure-sensitive adhesive treatment liquid falls within the ranges, the pressure-sensitive adhesive treatment liquid according to the embodiment of the present invention can more easily remove various kinds of pressure-sensitive adhesives.

In the pressure-sensitive adhesive treatment liquid according to the embodiment of the present invention, in the case where the Hansen solubility parameter value of the liquid in the pressure-sensitive adhesive treatment liquid is more than 31, the permeability of the pressure-sensitive adhesive treatment liquid into a pressure-sensitive adhesive may deteriorate, and hence it may become difficult to remove the pressure-sensitive adhesive. In addition, in the pressure-sensitive adhesive treatment liquid according to the embodiment of the present invention, in the case where the Hansen solubility parameter value of the liquid in the pressure-sensitive adhesive treatment liquid is less than 7, similarly, the permeability of the pressure-sensitive adhesive treatment liquid into the pressure-sensitive adhesive may deteriorate, and hence it may become difficult to remove the pressure-sensitive adhesive, though the difficulty is not as high as that in the case where the value is more than 31.

Typical examples of a liquid having a Hansen solubility parameter value of 31 or less, the liquid serving as a single liquid in the pressure-sensitive adhesive treatment liquid according to the embodiment of the present invention, include such liquids as described below.

Methanol (HSP value=29.6)
Ethanol (HSP value=26.5)
1-Propanol (HSP value=24.6)
2-Propanol (IPA) (HSP value=23.6)
1-Butanol (HSP value=23.2)
1-Pentanol (HSP value=21.7)
1-Hexanol (HSP value=21.2)
Benzyl alcohol (HSP value=23.8)
Diethylene glycol (HSP value=27.9)
Dipropylene glycol (SP value=26.4)

Those liquids may be used alone or in combination thereof. In addition to the liquid having a Hansen solubility parameter value of 31 or less, the liquid serving as a single liquid, a mixed liquid obtained by combining a plurality of liquids may be used as long as "m" in the formula (1) serving as the Hansen solubility parameter value of the mixed liquid is 31 or less. For example, a liquid obtained by mixing water (HSP value=47.8) and ethanol (HSP value=26.5) at a ratio "water/ethanol" of 20%/80% in terms of volume fraction may be used because its "m" is equal to 30.76.

Examples of a solvent that may be used in the mixed liquid obtained by combining a plurality of liquids include: water (HSP value=47.8); hydrocarbons, such as benzene (HSP value=18.5), toluene (HSP value=18.2), styrene (HSP value=19.1), hexane (HSP value=14.9), and cyclohexane (HSP value=16.8); ketones such as acetone (HSP value=19.9); esters such as ethyl acetate (HSP value=18.2); ethers, such as tetrahydrofuran (HSP value=19.5) and cyclopentyl methyl ether (HSP value=17.8); nitriles such as acetonitrile (HSP value=24.4); amines such as aniline (HSP value=23.7); carboxylic acids such as acetic acid (HSP value=21.4); and terpenes such as d-limonene (HSP value=17.8).

Any appropriate alkaline compound may be adopted as the alkaline compound in the pressure-sensitive adhesive treatment liquid according to the embodiment of the present invention to the extent that the effects of the present invention are not impaired. Examples of such alkali compound include: hydroxides or carbonates of alkali metals or alkaline earth metals, such as potassium hydroxide, sodium hydroxide, and calcium hydroxide; and metal alkoxides, such as sodium methoxide, sodium ethoxide, and potassium t-butoxide. Of those, at least one kind selected from the group consisting of: potassium hydroxide; and sodium hydroxide is preferred.

The concentration of the alkaline compound in the pressure-sensitive adhesive treatment liquid according to the embodiment of the present invention is from 0.001 wt % to 20 wt %, preferably from 0.01 wt % to 10 wt %, more preferably from 0.01 wt % to 5 wt %, still more preferably from 0.1 wt % to 1 wt %. When the concentration of the alkaline compound in the pressure-sensitive adhesive treatment liquid according to the embodiment of the present invention falls within the ranges, the pressure-sensitive adhesive treatment liquid according to the embodiment of the present invention can more easily remove various kinds of pressure-sensitive adhesives. When the concentration of the alkaline compound in the pressure-sensitive adhesive treatment liquid according to the embodiment of the present invention is more than 20 wt %, the alkaline compound is hardly dissolved in a treatment solvent. In addition, when a treatment object is in the form of a pressure-sensitive adhesive tape, the compound may adversely affect not only its pressure-sensitive adhesive but also its base material.

Any other additive may be incorporated into the pressure-sensitive adhesive treatment liquid according to the embodiment of the present invention. Any appropriate additive may be adopted as the other additive to the extent that the effects of the present invention are not impaired. Various known additives, such as an ionic surfactant, a nonionic surfactant, a chelating agent, a solubilizing agent, a slurrying agent, and an antifoaming agent, may each be added as such additive.

<<<<Pressure-Sensitive Adhesive Treatment Method>>>>

A pressure-sensitive adhesive treatment method according to an embodiment of the present invention is a method of treating a pressure-sensitive adhesive with the pressure-sensitive adhesive treatment liquid according to the embodiment of the present invention, the method including impregnating the pressure-sensitive adhesive with the pressure-sensitive adhesive treatment liquid. Such pressure-sensitive adhesive treatment method enables easy removal of various kinds of pressure-sensitive adhesives.

Any appropriate impregnation method may be appropriately adopted as a method of impregnating the pressure-sensitive adhesive with the pressure-sensitive adhesive treatment liquid in accordance with the scale of the impregnation and the kind of the pressure-sensitive adhesive. The phrase "impregnating the pressure-sensitive adhesive with the pressure-sensitive adhesive treatment liquid" as used herein refers to the establishment of such a state that the pressure-sensitive adhesive is impregnated with the pressure-sensitive adhesive treatment liquid, and refers to, for example, the establishment of a state in which at least part of the pressure-sensitive adhesive is immersed in the pressure-sensitive adhesive treatment liquid. The state in which at least part of the pressure-sensitive adhesive is immersed in the pressure-sensitive adhesive treatment liquid is preferred because the pressure-sensitive adhesive treatment liquid permeates the pressure-sensitive adhesive.

In the pressure-sensitive adhesive treatment method according to the embodiment of the present invention, one preferred embodiment is as follows: stirring is performed under a state in which the pressure-sensitive adhesive is impregnated with the pressure-sensitive adhesive treatment liquid. When the stirring is performed under the state in which the pressure-sensitive adhesive is impregnated with the pressure-sensitive adhesive treatment liquid, various kinds of pressure-sensitive adhesives can be more easily removed. The term "state in which the pressure-sensitive adhesive is impregnated with the pressure-sensitive adhesive treatment liquid" as used herein refers to such a state that the pressure-sensitive adhesive is impregnated with the pressure-sensitive adhesive treatment liquid, and refers to, for example, a state in which at least part of the pressure-sensitive adhesive is immersed in the pressure-sensitive adhesive treatment liquid. The state in which at least part of the pressure-sensitive adhesive is immersed in the pressure-sensitive adhesive treatment liquid is preferred because the pressure-sensitive adhesive treatment liquid permeates the pressure-sensitive adhesive.

Any appropriate stirring method may be appropriately adopted as a method for the stirring in accordance with the scale of the stirring and the kind of the pressure-sensitive adhesive.

In the pressure-sensitive adhesive treatment method according to the embodiment of the present invention, one preferred embodiment is as follows: ultrasonic treatment is performed under a state in which the pressure-sensitive adhesive is impregnated with the pressure-sensitive adhesive treatment liquid. When the ultrasonic treatment is performed under the state in which the pressure-sensitive adhesive is impregnated with the pressure-sensitive adhesive treatment liquid, various kinds of pressure-sensitive adhesives can be more easily removed.

Any appropriate ultrasonic treatment method may be appropriately adopted as a method for the ultrasonic treatment in accordance with the scale of the treatment and the kind of the pressure-sensitive adhesive.

In the pressure-sensitive adhesive treatment method according to the embodiment of the present invention, one preferred embodiment is as follows: the temperature of a surrounding environment in a state in which the pressure-sensitive adhesive is impregnated with the pressure-sensitive adhesive treatment liquid is preferably 20° C. or more, more preferably 25° C. or more, still more preferably 30° C. or more, still more preferably 35° C. or more, still more preferably 40° C. or more, still more preferably 45° C. or more, still more preferably 50° C. or more, still more preferably 55° C. or more, particularly preferably 60° C. or more, most preferably 65° C. or more. When the temperature of the surrounding environment in the state in which the pressure-sensitive adhesive is impregnated with the pressure-sensitive adhesive treatment liquid falls within the ranges, various kinds of pressure-sensitive adhesives can be more easily removed.

In the pressure-sensitive adhesive treatment method according to the embodiment of the present invention, another preferred embodiment is as follows: when a pressure-sensitive adhesive tape including a base material and a pressure-sensitive adhesive is used as a treatment object, the temperature of a surrounding environment in a state in which the pressure-sensitive adhesive is impregnated with the pressure-sensitive adhesive treatment liquid is 20° C. or more, and equal to or less than a temperature corresponding to the lower one of the melting point of the base material and the decomposition temperature of the pressure-sensitive adhesive. The temperature of the surrounding environment in the state in which the pressure-sensitive adhesive is impregnated with the pressure-sensitive adhesive treatment liquid is preferably 25° C. or more, and equal to or less than the temperature corresponding to the lower one of the melting point of the base material and the decomposition temperature of the pressure-sensitive adhesive, more preferably 25° C. or more, and equal to or less than the temperature corresponding to the lower one of the melting point of the base material and the decomposition temperature of the pressure-sensitive adhesive, more preferably 30° C. or more, and equal to or less than the temperature corresponding to the lower one of the melting point of the base material and the decomposition temperature of the pressure-sensitive adhesive, still more preferably 35° C. or more, and equal to or less than the temperature corresponding to the lower one of the melting point of the base material and the decomposition temperature of the pressure-sensitive adhesive, still more preferably 40° C. or more, and equal to or less than the temperature corresponding to the lower one of the melting point of the base material and the decomposition temperature of the pressure-sensitive adhesive, still more preferably 45° C. or more, and equal to or less than the temperature corresponding to the lower one of the melting point of the base material and the decomposition temperature of the pressure-sensitive adhesive, still more preferably 50° C. or more, and equal to or less than the temperature corresponding to the lower one of the melting point of the base material and the decomposition temperature of the pressure-sensitive adhesive, still more preferably 55° C. or more, and equal to or less than the temperature corresponding to the lower one of the melting point of the base material and the decomposition temperature of the pressure-sensitive adhesive, particularly preferably 60° C. or more, and equal to or less than the temperature corresponding to the lower one of the melting point of the base material and the decomposition temperature of the pressure-sensitive adhesive, most preferably 65° C. or more, and equal to or less than the temperature corresponding to the lower one of the melting point of the base material and the decomposition temperature of the pressure-sensitive adhesive. When the temperature of the surrounding environment in the state in which the pressure-sensitive adhesive is impregnated with the pressure-sensitive adhesive treatment liquid falls within the ranges, various kinds of pressure-sensitive adhesives can be more easily removed.

It is assumed that according to the pressure-sensitive adhesive treatment method according to the embodiment of the present invention, the pressure-sensitive adhesive is swollen with the pressure-sensitive adhesive treatment liquid, and hydrolysis (including a saponification reaction in which an ester and a base react with each other to produce a salt and an alcohol) or the like is advanced by the liquid having a Hansen solubility parameter value of 31 or less, and the alkaline compound in the pressure-sensitive adhesive treatment liquid. For example, when a pressure-sensitive adhesive tape including a base material and a pressure-sensitive adhesive is used as a treatment object, an anchoring strength between the base material and the pressure-sensitive adhesive, or a cohesive strength between the molecules of the pressure-sensitive adhesive is assumed to be reduced by the hydrolysis or the like of the pressure-sensitive adhesive to separate the pressure-sensitive adhesive from the base material. Accordingly, (1) the base material can be recovered under a state in which the base material can be recycled as it is as a base material, and (2) the pressure-sensitive adhesive is brought into the state of easily peeling from the base material, or can be recovered as a solution or a dispersion liquid by being dissolved or dispersed in the pressure-sensitive adhesive treatment liquid according to the embodiment of the present invention, and as required, by being further treated with an organic solvent, and in a preferred embodiment, can be recovered as a solution or a dispersion liquid of a polymer. When the polymer is a water-insoluble polymer, the polymer can be typically recovered as such a solution that the polymer is dissolved in the organic solvent, and when the polymer is a water-soluble polymer, the polymer can be typically recovered as such a solution that the polymer is dissolved in an aqueous solvent. Examples of the aqueous solvent include water, an alcohol, and a mixed solvent thereof, and a mixed solvent of such solvent and the organic solvent.

When a pressure-sensitive adhesive is treated with the pressure-sensitive adhesive treatment liquid according to the embodiment of the present invention by the pressure-sensitive adhesive treatment method according to the embodiment of the present invention, a solution or a dispersion liquid of a water-soluble polymer derived from the pressure-sensitive adhesive is preferably obtained. The term "water-soluble polymer derived from the pressure-sensitive adhesive" as used herein means a water-soluble polymer having a structure derived from a main polymer (also referred to as a "base polymer") used in the formation of the pressure-sensitive adhesive, and specifically means, for example, a water-soluble polymer having a structure in which at least part of functional groups (e.g., a carboxyl group and an ester group) present at the side-chain terminals of the main polymer (sometimes referred to as "base polymer") for forming the pressure-sensitive adhesive are subjected to hydrolysis (including a saponification reaction in which an ester and a base react with each other to produce a salt and an alcohol) by the liquid having a Hansen solubility parameter value of 31 or less, and the alkaline compound in the pressure-sensitive adhesive treatment liquid.

To obtain such water-soluble polymer as described above, the content of a carboxyl group-containing monomer in all monomers to be used for obtaining the main polymer (sometimes referred to as "base polymer") for forming the pressure-sensitive adhesive is preferably from 5 wt % to 95 wt %, more preferably from 10 wt % to 95 wt %, still more preferably from 15 wt % to 95 wt %, still more preferably from 20 wt % to 95 wt %, still more preferably from 25 wt % to 95 wt %, still more preferably from 30 wt % to 95 wt %, particularly preferably from 35 wt % to 90 wt %, most preferably from 40 wt % to 90 wt %. Examples of the carboxyl group-containing monomer include (meth)acrylic acid, itaconic acid, maleic acid, fumaric acid, crotonic acid, isocrotonic acid, and acid anhydrides thereof (e.g., acid anhydride group-containing monomers, such as maleic anhydride and itaconic anhydride). Of those, (meth)acrylic acid is preferred, and acrylic acid or an acrylic acid salt having an alkali cation as a counter cation is more preferred.

To obtain such water-soluble polymer as described above, the liquid having a Hansen solubility parameter value of 31 or less in the pressure-sensitive adhesive treatment liquid is preferably at least one kind selected from: a lower alcohol; and a mixed solvent of the lower alcohol and an organic solvent except the lower alcohol. The number of kinds of the lower alcohols may be only one, or two or more. The number of kinds of the organic solvents may be only one, or two or more.

In the mixed solvent of the lower alcohol and the organic solvent except the lower alcohol described above, the content of the lower alcohol in the mixed solvent of the lower alcohol and the organic solvent except the lower alcohol is preferably from 1 wt % to 90 wt %, more preferably from 5 wt % to 80 wt %, still more preferably from 10 wt % to 70 wt %, particularly preferably from 10 wt % to 60 wt %.

The lower alcohol includes preferably a lower alcohol having 1 to 5 carbon atoms (at least one kind selected from methanol, ethanol, butanol, 1-propanol, 2-propanol, and 1-pentanol), more preferably a lower alcohol having 1 to 4 carbon atoms (at least one kind selected from methanol, ethanol, butanol, 1-propanol, and 2-propanol), still more preferably a lower alcohol having 1 to 3 carbon atoms (at least one kind selected from methanol, ethanol, and butanol), particularly preferably a lower alcohol having 1 or 2 carbon atoms (at least one kind selected from methanol and ethanol). In addition, the lower alcohol may include not only primary alcohols but also secondary alcohols, such as isopropyl alcohol, propylene glycol monopropyl ether, and propylene glycol monoethyl ether, and tertiary alcohols such as t-butyl alcohol.

Examples of the organic solvent except the lower alcohol described above include: hydrocarbons, such as benzene, toluene, styrene, hexane, cyclohexane, and methylcyclohexane; ketones such as acetone; esters such as ethyl acetate; ethers, such as tetrahydrofuran and cyclopentyl methyl ether; nitriles such as acetonitrile; amines such as aniline; carboxylic acids such as acetic acid; and terpenes such as d-limonene. Of those, toluene, cyclopentyl methyl ether, and tetrahydrofuran are preferred, and toluene and cyclopentyl methyl ether are more preferred.

To obtain such water-soluble polymer as described above, the liquid having a Hansen solubility parameter value of 31 or less in the pressure-sensitive adhesive treatment liquid may contain a metal alkoxide as an alkaline compound. The number of kinds of such metal alkoxides may be only one, or two or more. Any appropriate metal alkoxide may be adopted as such metal alkoxide to the extent that the effects of the present invention are not impaired. Examples of such metal alkoxide include sodium methoxide, sodium ethoxide, and potassium t-butoxide.

According to the pressure-sensitive adhesive treatment method according to the embodiment of the present invention, the water-soluble polymer is simply obtained from the pressure-sensitive adhesive under a mild condition. This is probably because according to the pressure-sensitive adhesive treatment method according to the embodiment of the present invention, the hydrolysis (including a saponification reaction in which an ester and a base react with each other to produce a salt and an alcohol) of the pressure-sensitive adhesive simply advances under the mild condition to result in the water-soluble polymer.

To perform the hydrolysis (including a saponification reaction in which an ester and a base react with each other to produce a salt and an alcohol) of the pressure-sensitive adhesive, it has heretofore been required to subject the pressure-sensitive adhesive to the reaction under high-temperature and high-pressure conditions, or to design the composition of the pressure-sensitive adhesive to limited composition. According to the pressure-sensitive adhesive treatment method according to the embodiment of the present invention, satisfactory hydrolysis (including a saponification reaction in which an ester and a base react with each other to produce a salt and an alcohol) of the pressure-sensitive adhesive can be simply performed under a mild condition without setting of the high-temperature and high-pressure conditions, and without design of the composition of the pressure-sensitive adhesive to the limited composition.

<<<<Pressure-Sensitive Adhesive Tape Serving as Example of Treatment Object>>>>

A pressure-sensitive adhesive tape serving as an example of an object to be treated with the pressure-sensitive adhesive treatment liquid according to the embodiment of the present invention includes a base material and a pressure-sensitive adhesive, and is more specifically a pressure-sensitive adhesive tape including a base material layer and a pressure-sensitive adhesive layer as layer structures. The pressure-sensitive adhesive tape serving as the example of the treatment object may include any appropriate other layer to the extent that the effects of the present invention are not impaired as long as the pressure-sensitive adhesive tape includes the base material layer and the pressure-sensitive adhesive layer. The number of such other layers may be one, or two or more.

In one embodiment of the pressure-sensitive adhesive tape serving as the example of the treatment object, as illustrated in FIG. 1, a pressure-sensitive adhesive tape 100 is formed of a base material layer 10 and a pressure-sensitive adhesive layer 20.

Figure 2:
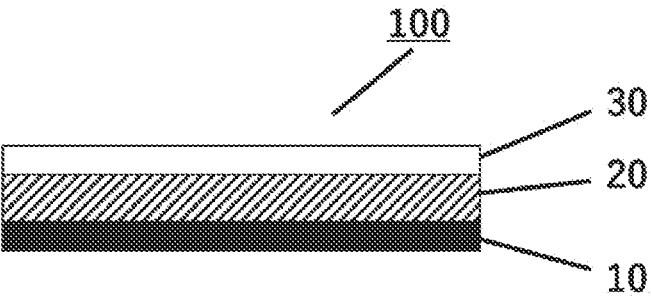
FIG. 2 is a schematic sectional view of another embodiment of the pressure-sensitive adhesive tape to which the pressure-sensitive adhesive treatment liquid and the pressure-sensitive adhesive treatment method according to the embodiments of the present invention may be applied.

In another embodiment of the pressure-sensitive adhesive tape serving as the example of the treatment object, as illustrated in FIG. 2, the pressure-sensitive adhesive tape 100 is formed of the base material layer 10, the pressure-sensitive adhesive layer 20, and a release film 30. The release film is also referred to as "separator".

Any appropriate thickness may be adopted as the thickness of the pressure-sensitive adhesive tape serving as the example of the treatment object to the extent that the effects of the present invention are not impaired. Such thickness is preferably from 5 μm to 2,000 μm.

<<Base Material>>

A base material formed from any appropriate material may be adopted as the base material to the extent that the effects of the present invention are not impaired. Examples of such material include a plastic film, a nonwoven fabric, paper, metal foil, a woven fabric, a rubber sheet, a foamed sheet, and a laminate thereof (in particular, a laminate including the plastic film).

Examples of the plastic film include: a plastic film including a polyester-based resin, such as polyethylene terephthalate (PET), polyethylene naphthalate (PEN), or polybutylene terephthalate (PBT); a plastic film including an olefin-based resin containing an α-olefin as a monomer component, such as polyethylene (PE), polypropylene (PP), polymethylpentene (PMP), an ethylene-propylene copolymer, or an ethylene-vinyl acetate copolymer (EVA); a plastic film including polyvinyl chloride (PVC); a plastic film including a vinyl acetate-based resin; a plastic film including polycarbonate (PC); a plastic film including polyphenylene sulfide (PPS); a plastic film including an amide-based resin, such as polyamide (nylon) or wholly aromatic polyamide (aramid); a plastic film including a polyimide-based resin; a plastic film including polyether ether ketone (PEEK); a plastic film including an olefin-based resin, such as polyethylene (PE) or polypropylene (PP); and a plastic film including a fluorine-based resin, such as polytetrafluoroethylene, polychlorotrifluoroethylene, polyvinyl fluoride, polyvinylidene fluoride, a tetrafluoroethylene-hexafluoropropylene copolymer, or a chlorofluoroethylene-vinylidene fluoride copolymer.

Examples of the nonwoven fabric include: nonwoven fabrics based on natural fibers each having heat resistance such as a nonwoven fabric including Manila hemp; and synthetic resin nonwoven fabrics, such as a polypropylene resin nonwoven fabric, a polyethylene resin nonwoven fabric, and an ester-based resin nonwoven fabric.

The number of the base materials serving as base material layers may be only one, or two or more.

The thickness of the base material serving as a base material layer is preferably from 5 μm to 250 μm because the effects of the present invention can be further expressed.

The base material may be subjected to surface treatment. Examples of the surface treatment include corona treatment, plasma treatment, chromic acid treatment, ozone exposure, flame exposure, high-voltage electric shock exposure, ionizing radiation treatment, and coating treatment with an undercoating agent.

The base material may contain any appropriate other additive to the extent that the effects of the present invention are not impaired.

<<Pressure-Sensitive Adhesive>>

Any appropriate pressure-sensitive adhesive may be adopted as the pressure-sensitive adhesive to the extent that the effects of the present invention are not impaired. The number of the pressure-sensitive adhesives serving as pressure-sensitive adhesive layers may be only one, or two or more.

The pressure-sensitive adhesive comes in various sizes and shapes because the pressure-sensitive adhesive is in the form of a pressure-sensitive adhesive layer in a pressure-sensitive adhesive tape, is in the form of a pressure-sensitive adhesive present as an adhesive residue on an adherend, or is a pressure-sensitive adhesive adhering to a production device, such as a polymerization kettle, an application machine, or an application roll. For example, when the pressure-sensitive adhesive is in the form of the pressure-sensitive adhesive layer in the pressure-sensitive adhesive tape, its thickness is preferably from 1 μm to 2,000 μm because the effects of the present invention can be further expressed.

The pressure-sensitive adhesive preferably includes at least one kind selected from the group consisting of: an acrylic pressure-sensitive adhesive; a urethane-based pressure-sensitive adhesive; a rubber-based pressure-sensitive adhesive; and a silicone-based pressure-sensitive adhesive.

The pressure-sensitive adhesive may be formed by any appropriate method. An example of such method is a method including: applying a pressure-sensitive adhesive composition (at least one kind selected from the group consisting of: an acrylic pressure-sensitive adhesive composition; a urethane-based pressure-sensitive adhesive composition; a rubber-based pressure-sensitive adhesive composition; and a silicone-based pressure-sensitive adhesive composition) onto any appropriate base material; heating and drying the composition as required; and curing the composition as required to form the pressure-sensitive adhesive (specifically, a pressure-sensitive adhesive layer) on the base material. Examples of such application method include methods involving using a gravure roll coater, a reverse roll coater, a kiss roll coater, a dip roll coater, a bar coater, a knife coater, an air knife coater, a spray coater, a comma coater, a direct coater, and a roll brush coater.

<Acrylic Pressure-Sensitive Adhesive>

The acrylic pressure-sensitive adhesive is formed from the acrylic pressure-sensitive adhesive composition.

The acrylic pressure-sensitive adhesive composition preferably contains an acrylic polymer and a cross-linking agent because the effects of the present invention can be further expressed.

The acrylic polymer is what may be called a base polymer in the field of acrylic pressure-sensitive adhesives. The number of kinds of the acrylic polymers may be only one, or two or more.

The content of the acrylic polymer in the acrylic pressure-sensitive adhesive composition is preferably from 50 wt % to 100 wt %, more preferably from 60 wt % to 100 wt %, still more preferably from 70 wt % to 100 wt %, particularly preferably from 80 wt % to 100 wt %, most preferably from 90 wt % to 100 wt % in terms of solid content.

Any appropriate acrylic polymer may be adopted as the acrylic polymer to the extent that the effects of the present invention are not impaired.

The weight-average molecular weight of the acrylic polymer is preferably from 100,000 to 3,000,000, more preferably from 150,000 to 2,000,000, still more preferably from 200,000 to 1,500,000, particularly preferably from 250,000 to 1,000,000 because the effects of the present invention can be further expressed.

The acrylic polymer is preferably an acrylic polymer formed through polymerization from a composition (A) containing a (meth)acrylic acid alkyl ester whose alkyl ester moiety has an alkyl group having 4 to 12 carbon atoms (component "a"), and at least one kind selected from the group consisting of: a (meth)acrylic acid ester having a OH group; and (meth)acrylic acid (component "b") because the effects of the present invention can be further expressed. The number of kinds of the components "a" and the number of kinds of the components "b" may each be independently only one, or two or more.

Examples of the (meth)acrylic acid alkyl ester whose alkyl ester moiety has an alkyl group having 4 to 12 carbon atoms (component "a") include n-butyl (meth)acrylate, isobutyl (meth)acrylate, s-butyl (meth)acrylate, t-butyl (meth)acrylate, pentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, and dodecyl (meth) acrylate. Of those, n-butyl (meth)acrylate and 2-ethylhexyl (meth)acrylate are preferred, and n-butyl acrylate and 2-ethylhexyl acrylate are more preferred because the effects of the present invention can be further expressed.

Examples of the at least one kind selected from the group consisting of: a (meth)acrylic acid ester having a OH group; and (meth)acrylic acid (component "b") include: (meth)acrylic acid esters each having a OH group, such as hydroxyethyl (meth)acrylate, hydroxypropyl (meth)acrylate, and hydroxybutyl (meth)acrylate; and (meth)acrylic acid. Of those, hydroxyethyl (meth)acrylate and (meth)acrylic acid are preferred, and hydroxyethyl acrylate and acrylic acid are more preferred because the effects of the present invention can be further expressed.

The composition (A) may contain a copolymerizable monomer except the component "a" and the component "b". The number of kinds of the copolymerizable monomers may be only one, or two or more. Examples of such copolymerizable monomer include: carboxyl group-containing monomers (provided that (meth)acrylic acid is excluded), such as itaconic acid, maleic acid, fumaric acid, crotonic acid, isocrotonic acid, and acid anhydrides thereof (e.g., acid anhydride group-containing monomers, such as maleic anhydride and itaconic anhydride); amide group-containing monomers, such as (meth)acrylamide, N,N-dimethyl (meth) acrylamide, N-methylol (meth)acrylamide, N-methoxymethyl (meth)acrylamide, N-butoxymethyl (meth)acrylamide, and N-hydroxyethyl (meth)acrylamide; amino group-containing monomers, such as aminoethyl (meth)acrylate, dimethylaminoethyl (meth)acrylate, and t-butylaminoethyl (meth)acrylate; epoxy group-containing monomers, such as glycidyl (meth)acrylate and methylglycidyl (meth)acrylate; cyano group-containing monomers, such as acrylonitrile and methacrylonitrile; heterocycle-containing vinyl-based monomers, such as N-vinyl-2-pyrrolidone, (meth)acryloylmorpholine, N-vinylpiperidone, N-vinylpiperazine, N-vinylpyrrole, N-vinyl imidazole, vinylpyridine, vinylpyrimidine, and vinyloxazole; sulfonic acid group-containing monomers such as sodium vinylsulfonate; phosphoric acid group-containing monomers such as 2-hydroxyethylacryloyl phosphate; imide group-containing monomers, such as cyclohexylmaleimide and isopropylmaleimide; isocyanate group-containing monomers such as 2-methacryloyloxyethyl isocyanate; (meth)acrylic acid esters each having an alicyclic hydrocarbon group, such as cyclopentyl (meth) acrylate, cyclohexyl (meth)acrylate, and isobornyl (meth) acrylate; (meth)acrylic acid esters each having an aromatic hydrocarbon group, such as phenyl (meth)acrylate, phenoxyethyl (meth)acrylate, and benzyl (meth)acrylate; vinyl esters, such as vinyl acetate and vinyl propionate; aromatic vinyl compounds, such as styrene and vinyltoluene; olefins and dienes, such as ethylene, butadiene, isoprene, and isobutylene; vinyl ethers such as a vinyl alkyl ether; and vinyl chloride.

A polyfunctional monomer may also be adopted as the copolymerizable monomer. The "polyfunctional monomer" refers to a monomer having two or more ethylenically unsaturated groups in a molecule thereof. Any appropriate ethylenically unsaturated groups may be adopted as the ethylenically unsaturated groups to the extent that the effects of the present invention are not impaired. Examples of such ethylenically unsaturated group include radical-polymerizable functional groups, such as a vinyl group, a propenyl group, an isopropenyl group, a vinyl ether group (vinyloxy group), and an allyl ether group (allyloxy group). Examples of the polyfunctional monomer include hexanediol di(meth) acrylate, butanediol di(meth)acrylate, (poly)ethylene glycol di(meth)acrylate, (poly) propylene glycol di(meth)acrylate, neopentyl glycol di(meth)acrylate, pentaerythritol di(meth) acrylate, pentaerythritol tri(meth)acrylate, dipentaerythritol hexa(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, and urethane acrylate. The number of kinds of such polyfunctional monomers may be only one, or two or more.

A (meth)acrylic acid alkoxyalkyl ester may also be adopted as the copolymerizable monomer. Examples of the (meth)acrylic acid alkoxyalkyl ester include 2-methoxyethyl (meth)acrylate, 2-ethoxyethyl (meth)acrylate, methoxytriethylene glycol (meth)acrylate, 3-methoxypropyl (meth) acrylate, 3-ethoxypropyl (meth)acrylate, 4-methoxybutyl (meth)acrylate, and 4-ethoxybutyl (meth)acrylate. The number of kinds of the (meth)acrylic acid alkoxyalkyl esters may be only one, or two or more.

The content of the (meth)acrylic acid alkyl ester whose alkyl ester moiety has an alkyl group having 4 to 12 carbon atoms (component "a") is preferably 50 wt % or more, more preferably from 60 wt % to 100 wt %, still more preferably from 70 wt % to 100 wt %, particularly preferably from 80 wt % to 100 wt % with respect to the total amount (100 wt %) of the monomer components for forming the acrylic polymer because the effects of the present invention can be further expressed.

The content of the at least one kind selected from the group consisting of: a (meth)acrylic acid ester having a OH group; and (meth)acrylic acid (component "b") is preferably 0.1 wt % or more, more preferably from 1.0 wt % to 50 wt %, still more preferably from 1.5 wt % to 40 wt %, particularly preferably from 2.0 wt % to 30 wt % with respect to the total amount (100 wt %) of the monomer components for forming the acrylic polymer because the effects of the present invention can be further expressed.

The composition (A) may contain any appropriate other component to the extent that the effects of the present invention are not impaired. Examples of such other component include a polymerization initiator, a chain transfer agent, and a solvent. Any appropriate content may be adopted as the content of each of those other components to the extent that the effects of the present invention are not impaired.

A thermal polymerization initiator, a photopolymerization initiator (photoinitiator), or the like may be adopted as the polymerization initiator in accordance with the kind of a polymerization reaction. The number of kinds of the polymerization initiators may be only one, or two or more.

The thermal polymerization initiator may be preferably adopted at the time of the production of the acrylic polymer by solution polymerization. Examples of such thermal polymerization initiator include an azo-based polymerization initiator, a peroxide-based polymerization initiator (e.g., dibenzoyl peroxide or tert-butyl permaleate), and a redox-based polymerization initiator. Of those thermal polymerization initiators, an azo-based polymerization initiator disclosed in JP 2002-69411 A is particularly preferred. Such azo-based polymerization initiator is preferred because a decomposed product of the polymerization initiator hardly remains as a portion, which serves as a cause for the generation of a heat-generated gas (outgas), in the acrylic polymer. Examples of the azo-based polymerization initiator include 2,2'-azobisisobutyronitrile (hereinafter sometimes referred to as "AIBN"), 2,2'-azobis-2-methylbutyronitrile (hereinafter sometimes referred to as "AMBN"), dimethyl 2,2'-azobis(2-methylpropionate), and 4,4'-azobis-4-cyanovaleric acid. The usage amount of the azo-based polymerization initiator is preferably from 0.01 part by weight to 5.0 parts by weight, more preferably from 0.05 part by weight to 4.0 parts by weight, still more preferably from 0.1 part by weight to 3.0 parts by weight, particularly preferably from 0.15 part by weight to 3.0 parts by weight, most preferably from 0.20 part by weight to 2.0 parts by weight with respect to the total amount (100 parts by weight) of the monomer components for forming the acrylic polymer.

The photopolymerization initiator may be preferably adopted at the time of the production of the acrylic polymer by active energy ray polymerization. Examples of the photopolymerization initiator include a benzoin ether-based photopolymerization initiator, an acetophenone-based photopolymerization initiator, an α-ketol-based photopolymerization initiator, an aromatic sulfonyl chloride-based photopolymerization initiator, a photoactive oxime-based photopolymerization initiator, a benzoin-based photopolymerization initiator, a benzil-based photopolymerization initiator, a benzophenone-based photopolymerization initiator, a ketal-based photopolymerization initiator, and a thioxanthone-based photopolymerization initiator.

Examples of the benzoin ether-based photopolymerization initiator include benzoin methyl ether, benzoin ethyl ether, benzoin propyl ether, benzoin isopropyl ether, benzoin isobutyl ether, 2,2-dimethoxy-1,2-diphenylethan-1-one, and anisole methyl ether. Examples of the acetophenone-based photopolymerization initiator include 2,2-diethoxyacetophenone, 2,2-dimethoxy-2-phenylacetophenone, 1-hydroxycyclohexyl phenyl ketone, 4-phenoxydichloroacetophenone, and 4-(t-butyl)dichloroacetophenone. Examples of the α-ketol-based photopolymerization initiator include 2-methyl-2-hydroxypropiophenone and 1-[4-(2-hydroxyethyl)phenyl]-2-methylpropan-1-one. An example of the aromatic sulfonyl chloride-based photopolymerization initiator is 2-naphthalenesulfonyl chloride. An example of the photoactive oxime-based photopolymerization initiator is 1-phenyl-1,1-propanedione-2-(o-ethoxycarbonyl)-oxime.

An example of the benzoin-based photopolymerization initiator is benzoin. An example of the benzil-based photopolymerization initiator is benzil. Examples of the benzophenone-based photopolymerization initiator include benzophenone, benzoyl benzoic acid, 3,3'-dimethyl-4-methoxybenzophenone, polyvinylbenzophenone, and α-hydroxycyclohexyl phenyl ketone. An example of the ketal-based photopolymerization initiator is benzyl dimethyl ketal. Examples of the thioxanthone-based photopolymerization initiator include thioxanthone, 2-chlorothioxanthone, 2-methylthioxanthone, 2,4-dimethylthioxanthone, isopropylthioxanthone, 2,4-diisopropylthioxanthone, and dodecylthioxanthone.

The usage amount of the photopolymerization initiator is preferably from 0.01 part by weight to 3.0 parts by weight, more preferably from 0.015 part by weight to 2.0 parts by weight, still more preferably from 0.02 part by weight to 1.5 parts by weight, particularly preferably from 0.025 part by weight to 1.0 part by weight, most preferably from 0.03 part by weight to 0.50 part by weight with respect to the total amount (100 parts by weight) of the monomer components for forming the acrylic polymer.

The acrylic pressure-sensitive adhesive composition may contain a cross-linking agent. When the cross-linking agent is used, the cohesive strength of the acrylic pressure-sensitive adhesive can be improved, and hence the effects of the present invention can be further expressed. The number of kinds of the cross-linking agents may be only one, or two or more.

Examples of the cross-linking agent include a polyfunctional isocyanate-based cross-linking agent, an epoxy-based cross-linking agent, a melamine-based cross-linking agent, and a peroxide-based cross-linking agent, and as well, a urea-based cross-linking agent, a metal alkoxide-based cross-linking agent, a metal chelate-based cross-linking agent, a metal salt-based cross-linking agent, a carbodiimide-based cross-linking agent, an oxazoline-based cross-linking agent, an aziridine-based cross-linking agent, and an amine-based cross-linking agent. Of those, at least one kind selected from the group consisting of: a polyfunctional isocyanate-based cross-linking agent; and an epoxy-based cross-linking agent (component "c") is preferred because the effects of the present invention can be further expressed.

Examples of the polyfunctional isocyanate-based cross-linking agent include: lower aliphatic polyisocyanates, such as 1,2-ethylene diisocyanate, 1,4-butylene diisocyanate, and 1,6-hexamethylene diisocyanate; alicyclic polyisocyanates, such as cyclopentylene diisocyanate, cyclohexylene diisocyanate, isophorone diisocyanate, hydrogenated tolylene diisocyanate, and hydrogenated xylene diisocyanate; and aromatic polyisocyanates, such as 2,4-tolylene diisocyanate, 2,6-tolylene diisocyanate, 4,4'-diphenylmethane diisocyanate, and xylylene diisocyanate. Examples of the polyfunctional isocyanate-based cross-linking agent also include commercially available products, such as a trimethylolpropane/tolylene diisocyanate adduct (manufactured by Nippon Polyurethane Industry Co., Ltd., product name: "CORONATE L"), a trimethylolpropane/hexamethylene diisocyanate adduct (manufactured by Nippon Polyurethane Industry Co., Ltd., product name: "CORONATE HL"), a product available under the product name "CORONATE HX" (Nippon Polyurethane Industry Co., Ltd.), and a trimethylolpropane/xylylene diisocyanate adduct (manufactured by Mitsui Chemicals, Inc., product name: "TAKENATE 110N").

Examples of the epoxy-based cross-linking agent (polyfunctional epoxy compound) include N,N,N',N'-tetraglycidyl-m-xylenediamine, diglycidylaniline, 1,3-bis(N, N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, adipic acid diglycidyl ester, o-phthalic acid diglycidyl ester, triglycidyl-tris (2-hydroxyethyl) isocyanurate, resorcinol diglycidyl ether, bisphenol-S-diglycidyl ether, and an epoxy-based resin having two or more epoxy groups in a molecule thereof. Examples of the epoxy-based cross-linking agent also include commercially available products such as a product available under the product name "TETRAD-C" (manufactured by Mitsubishi Gas Chemical Company, Inc.).

Any appropriate content may be adopted as the content of the cross-linking agent in the acrylic pressure-sensitive adhesive composition to the extent that the effects of the present invention are not impaired. Such content is, for example, preferably from 0.1 part by weight to 5.0 parts by weight, more preferably from 0.2 part by weight to 4.5 parts by weight, still more preferably from 0.3 part by weight to 4.0 parts by weight, particularly preferably from 0.4 part by weight to 3.5 parts by weight with respect to the solid content (100 parts by weight) of the acrylic polymer because the effects of the present invention can be further expressed.

The acrylic pressure-sensitive adhesive composition may contain any appropriate other component to the extent that the effects of the present invention are not impaired. Examples of such other component include a polymer component except the acrylic polymer, a cross-linking accelerator, a cross-linking catalyst, a silane coupling agent, a tackifier resin (e.g., a rosin derivative, a polyterpene resin, a petroleum resin, or an oil-soluble phenol), an age resistor, an inorganic filler, an organic filler, a metal powder, a colorant (e.g., a pigment or a dye), a foil-like material, a UV absorber, an antioxidant, a light stabilizer, a chain transfer agent, a plasticizer, a softening agent, a surfactant, an antistatic agent, a conductive agent, a stabilizer, a surface lubricant, a leveling agent, a corrosion inhibitor, a heat stabilizer, a polymerization inhibitor, a lubricant, a solvent, and a catalyst.

<Urethane-Based Pressure-Sensitive Adhesive>

The urethane-based pressure-sensitive adhesive is formed of the urethane-based pressure-sensitive adhesive composition.

The urethane-based pressure-sensitive adhesive composition preferably contains at least one kind selected from the group consisting of: a urethane prepolymer; and a polyol, and a cross-linking agent because the effects of the present invention can be further expressed.

The at least one kind selected from the group consisting of: a urethane prepolymer; and a polyol is what may be called a base polymer in the field of urethane-based pressure-sensitive adhesives. The number of kinds of the urethane prepolymers may be only one, or two or more. The number of kinds of the polyols may be only one, or two or more.

[Urethane Prepolymer]

The urethane prepolymer is preferably a polyurethane polyol, more preferably a product obtained by allowing one of a polyester polyol (a1) or a polyether polyol (a2) alone, or a mixture of (a1) and (a2) to react with an organic polyisocyanate compound (a3) in the presence or absence of a catalyst.

Any appropriate polyester polyol may be used as the polyester polyol (a1). Such polyester polyol (a1) is, for example, a polyester polyol obtained by allowing an acid component and a glycol component to react with each other. Examples of the acid component include terephthalic acid, adipic acid, azelaic acid, sebacic acid, phthalic anhydride, isophthalic acid, and trimellitic acid. Examples of the glycol component include ethylene glycol, propylene glycol, diethylene glycol, butylene glycol, 1,6-hexane glycol, 3-methyl-1,5-pentanediol, 3,3'-dimethylolheptane, polyoxyethylene glycol, polyoxypropylene glycol, 1,4-butanediol, neopentyl glycol, butylethylpentanediol, and glycerin, trimethylolpropane, or pentaerythritol serving as a polyol component. Other examples of the polyester polyol (a1) include polyester polyols obtained by subjecting lactones, such as polycaprolactone, poly($\beta$-methyl-$\gamma$-valerolactone), and polyvalerolactone, to ring-opening polymerization.

Any value in the range of from a low molecular weight to a high molecular weight may be used as the molecular weight of the polyester polyol (a1). The molecular weight of the polyester polyol (a1) is preferably from 100 to 100,000 in terms of number-average molecular weight because the effects of the present invention can be further expressed. When the number-average molecular weight is less than 100, there is a risk in that the reactivity of the polyol becomes higher, and hence the polyol is liable to gel. When the number-average molecular weight is more than 100,000, there is a risk in that the reactivity reduces, and the cohesive strength of the polyurethane polyol itself reduces. The usage amount of the polyester polyol (a1) is preferably from 0 mol % to 90 mol % in the polyols for forming the polyurethane polyol because the effects of the present invention can be further expressed.

Any appropriate polyether polyol may be used as the polyether polyol (a2). Such polyether polyol (a2) is, for example, a polyether polyol obtained by polymerizing an oxirane compound, such as ethylene oxide, propylene oxide, butylene oxide, or tetrahydrofuran, through use of water or a low-molecular weight polyol, such as propylene glycol, ethylene glycol, glycerin, or trimethylolpropane, as an initiator. Such polyether polyol (a2) is specifically, for example, a polyether polyol having 2 or more functional groups, such as polypropylene glycol, polyethylene glycol, or polytetramethylene glycol.

Any value in the range of from a low molecular weight to a high molecular weight may be used as the molecular weight of the polyether polyol (a2). The molecular weight of the polyether polyol (a2) is preferably from 100 to 100,000 in terms of number-average molecular weight because the effects of the present invention can be further expressed. When the number-average molecular weight is less than 100, there is a risk in that the reactivity of the polyol becomes higher, and hence the polyol is liable to gel. When the number-average molecular weight is more than 100,000, there is a risk in that the reactivity reduces, and the cohesive strength of the polyurethane polyol itself reduces. The usage amount of the polyether polyol (a2) is preferably from 0 mol % to 90 mol % in the polyols for forming the polyurethane polyol because the effects of the present invention can be further expressed.

A product obtained by substituting part of the polyether polyol (a2) with, for example, a glycol, such as ethylene glycol, 1,4-butanediol, neopentyl glycol, butylethylpentanediol, glycerin, trimethylolpropane, or pentaerythritol, or a polyvalent amine, such as ethylenediamine, N-aminoethylethanolamine, isophoronediamine, or xylylenediamine, as required may be used in combination.

Only a bifunctional polyether polyol may be used as the polyether polyol (a2), or a polyether polyol having a number-average molecular weight of from 100 to 100,000 and having at least 3 hydroxy groups in a molecule thereof may be partially or wholly used. When the polyether polyol having a number-average molecular weight of from 100 to 100,000 and having at least 3 hydroxy groups in a molecule thereof is partially or wholly used as the polyether polyol (a2), the effects of the present invention can be further expressed, and a balance between the pressure-sensitive adhesive strength and peelability of the pressure-sensitive adhesive layer can become satisfactory. When the number-average molecular weight in such polyether polyol is less than 100, there is a risk in that its reactivity becomes higher, and hence the polyol is liable to gel. In addition, when the number-average molecular weight in such polyether polyol is more than 100,000, there is a risk in that the reactivity reduces, and the cohesive strength of the polyurethane polyol itself reduces. The number-average molecular weight of such polyether polyol is more preferably from 100 to 10,000 because the effects of the present invention can be further expressed.

Any appropriate polyisocyanate compound may be used as the organic polyisocyanate compound (a3). Examples of such organic polyisocyanate compound (a3) include an aromatic polyisocyanate, an aliphatic polyisocyanate, an aromatic aliphatic polyisocyanate, and an alicyclic polyisocyanate.

Examples of the aromatic polyisocyanate include 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, 2,4,6-triisocyanatotoluene, 1,3,5-triisocyanatobenzene, dianisidine diisocyanate, 4,4'-diphenyl ether diisocyanate, and 4,4',4"-triphenylmethane triisocyanate.

Examples of the aliphatic polyisocyanate include trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, dodecamethylene diisocyanate, and 2,4,4-trimethylhexamethylene diisocyanate.

Examples of the aromatic aliphatic polyisocyanate include ω,ω'-diisocyanato-1,3-dimethylbenzene, ω,ω'-diisocyanato-1,4-dimethylbenzene, ω,ω'-diisocyanato-1,4-diethylbenzene, 1,4-tetramethylxylylene diisocyanate, and 1,3-tetramethylxylylene diisocyanate.

Examples of the alicyclic polyisocyanate include 3-isocyanatomethyl-3,5,5-trimethylcyclohexyl isocyanate, 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis(cyclohexyl isocyanate), and 1,4-bis(isocyanatomethyl)cyclohexane.

A trimethylolpropane adduct of any such compound as described above, a biuret thereof formed by a reaction with water, a trimer thereof having an isocyanurate ring, or the like may be used as the organic polyisocyanate compound (a3) in combination with the above-mentioned compound.

Any appropriate catalyst may be used as a catalyst that may be used in obtaining the polyurethane polyol. Examples of such catalyst include a tertiary amine-based compound and an organometallic compound.

Examples of the tertiary amine-based compound include triethylamine, triethylenediamine, and 1,8-diazabicyclo(5,4,0)-undecene-7 (DBU).

Examples of the organometallic compound include a tin-based compound and a non-tin-based compound.

Examples of the tin-based compound include dibutyltin dichloride, dibutyltin oxide, dibutyltin dibromide, dibutyltin dimaleate, dibutyltin dilaurate (DBTDL), dibutyltin diacetate, dibutyltin sulfide, tributyltin sulfide, tributyltin oxide, tributyltin acetate, triethyltin ethoxide, tributyltin ethoxide, dioctyltin oxide, tributyltin chloride, tributyltin trichloroacetate, and tin 2-ethylhexanoate.

Examples of the non-tin-based compound include: titanium-based compounds, such as dibutyltitanium dichloride, tetrabutyl titanate, and butoxytitanium trichloride; lead-based compounds, such as lead oleate, lead 2-ethylhexanoate, lead benzoate, and lead naphthenate; iron-based compounds, such as iron 2-ethylhexanoate and iron acetylacetonate; cobalt-based compounds, such as cobalt benzoate and cobalt 2-ethylhexanoate; zinc-based compounds, such as zinc naphthenate and zinc 2-ethylhexanoate; and zirconium-based compounds such as zirconium naphthenate.

When the catalyst is used in obtaining the polyurethane polyol, in a system where the two kinds of polyols, that is, the polyester polyol and the polyether polyol are present, a single catalyst system is liable to cause a problem in that the polyols gel or a reaction solution becomes cloudy owing to a difference in reactivity between the polyols. In view of the foregoing, when two kinds of catalysts are used in obtaining the polyurethane polyol, it becomes easier to control a reaction rate, the selectivity of the catalysts, and the like, and hence such problem can be solved. Examples of the combination of such two kinds of catalysts include: the combination of a tertiary amine-based compound and an organometallic compound; the combination of a tin-based compound and a non-tin-based compound; and the combination of a tin-based compound and another tin-based compound. Of those, the combination of a tin-based compound and another tin-based compound is preferred, and the combination of dibutyltin dilaurate and tin 2-ethylhexanoate is more preferred. A blending ratio "tin 2-ethylhexanoate/dibutyltin dilaurate" is preferably less than 1, more preferably from 0.2 to 0.6 in terms of weight ratio. When the blending ratio is 1 or more, the polyols may be liable to gel owing to a poor balance between the catalytic activities of the catalysts.

When the catalyst is used in obtaining the polyurethane polyol, the usage amount of the catalyst is preferably from 0.01 wt % to 1.0 wt % with respect to the total amount of the polyester polyol (a1), the polyether polyol (a2), and the organic polyisocyanate compound (a3).

When the catalyst is used in obtaining the polyurethane polyol, a reaction temperature is preferably less than 100° C., more preferably from 85° C. to 95° C. When the temperature is 100° C. or more, it may be difficult to control the reaction rate and the cross-linked structure of the polyurethane polyol, and hence a polyurethane polyol having a predetermined molecular weight may be hardly obtained.

No catalyst may be used in obtaining the polyurethane polyol. In that case, the reaction temperature is preferably 100° C. or more, more preferably 110° C. or more. In addition, when the polyurethane polyol is obtained in the absence of any catalyst, the polyols (a1) and (a2), and the compound (a3) are preferably allowed to react with each other for 3 hours or more.

A method of obtaining the polyurethane polyol is, for example, (1) a method involving loading the total amount of the polyester polyol, the polyether polyol, the catalyst, and the organic polyisocyanate compound into a flask, or (2) a method involving loading the polyester polyol, the polyether polyol, and the catalyst into a flask, and adding the organic polyisocyanate compound to the mixture. Of those, the method (2) is preferred as a method of obtaining the polyurethane polyol in terms of the control of the reaction.

Any appropriate solvent may be used in obtaining the polyurethane polyol. Examples of such solvent include methyl ethyl ketone, ethyl acetate, toluene, xylene, and acetone. Of those solvents, toluene is preferred.

[Polyol]

Preferred examples of the polyol include polyester polyol, polyether polyol, polycaprolactone polyol, polycarbonate polyol, and castor oil-based polyol. The polyol is more preferably polyether polyol.

The polyester polyol may be obtained through, for example, an esterification reaction between a polyol component and an acid component.

Examples of the polyol component include ethylene glycol, diethylene glycol, 1,3-butanediol, 1,4-butanediol, neopentyl glycol, 3-methyl-1,5-pentanediol, 2-butyl-2-ethyl-1,3-propanediol, 2,4-diethyl-1,5-pentanediol, 1,2-hexanediol, 1,6-hexanediol, 1,8-octanediol, 1,9-nonanediol, 2-methyl-1,8-octanediol, 1,8-decanediol, octadecanediol, glycerin, trimethylolpropane, pentaerythritol, hexanetriol, and polypropylene glycol. Examples of the acid component include succinic acid, methylsuccinic acid, adipic acid, pimelic acid, azelaic acid, sebacic acid, 1,12-dodecanedioic acid, 1,14-tetradecanedioic acid, dimer acid, 2-methyl-1,4-cyclohexanedicarboxylic acid, 2-ethyl-1,4-cyclohexanedicarboxylic acid, terephthalic acid, isophthalic acid, phthalic acid, 1,4-naphthalenedicarboxylic acid, 4,4'-biphenyldicarboxylic acid, and acid anhydrides thereof.

An example of the polyether polyol is a polyether polyol obtained by subjecting water, a low-molecular polyol (e.g., propylene glycol, ethylene glycol, glycerin, trimethylolpropane, or pentaerythritol), a bisphenol (e.g., bisphenol A), or a dihydroxybenzene (e.g., catechol, resorcin, or hydroquinone) serving as an initiator to addition polymerization with an alkylene oxide, such as ethylene oxide, propylene oxide, or butylene oxide. Specific examples thereof include polyethylene glycol, polypropylene glycol, and polytetramethylene glycol.

An example of the polycaprolactone polyol is a caprolactone-based polyester diol obtained by subjecting a cyclic ester monomer, such as ε-caprolactone or σ-valerolactone, to ring-opening polymerization.

Examples of the polycarbonate polyol include: a polycarbonate polyol obtained by subjecting the polyol component and phosgene to a polycondensation reaction; a polycarbonate polyol obtained by subjecting the polyol component and a carbonate diester, such as dimethyl carbonate, diethyl carbonate, dipropyl carbonate, diisopropyl carbonate, dibutyl carbonate, ethylbutyl carbonate, ethylene carbonate, propylene carbonate, diphenyl carbonate, or dibenzyl carbonate, to transesterification condensation; a copolymerized polycarbonate polyol obtained by using two or more kinds of the polyol components in combination; a polycarbonate polyol obtained by subjecting any of the various polycarbonate polyols and a carboxyl group-containing compound to an esterification reaction; a polycarbonate polyol obtained by subjecting any of the various polycarbonate polyols and a hydroxyl group-containing compound to an etherification reaction; a polycarbonate polyol obtained by subjecting any of the various polycarbonate polyols and an ester compound to a transesterification reaction; a polycarbonate polyol obtained by subjecting any of the various polycarbonate polyols and a hydroxyl group-containing compound to a transesterification reaction; a polyester-based polycarbonate polyol obtained by subjecting any of the various polycarbonate polyols and a dicarboxylic acid compound to a polycondensation reaction; and a copolymerized polyether-based polycarbonate polyol obtained by subjecting any of the various polycarbonate polyols and an alkylene oxide to copolymerization.

An example of the castor oil-based polyol is a castor oil-based polyol obtained by allowing a castor oil fatty acid and the polyol component to react with each other. A specific example thereof is a castor oil-based polyol obtained by allowing a castor oil fatty acid and polypropylene glycol to react with each other.

The number-average molecular weight Mn of the polyols is preferably from 300 to 100,000, more preferably from 400 to 75,000, still more preferably from 450 to 50,000, particularly preferably from 500 to 30,000 because the effects of the present invention can be further expressed.

The polyols preferably contain a polyol (A1) having 3 OH groups and having a number-average molecular weight Mn of from 300 to 100,000 because the effects of the present invention can be further expressed. The number of kinds of the polyols (A1) may be only one, or two or more.

The content of the polyol (A1) in the polyols is preferably 5 wt % or more, more preferably from 25 wt % to 100 wt %, still more preferably from 50 wt % to 100 wt % because the effects of the present invention can be further expressed.

The number-average molecular weight Mn of the polyol (A1) is preferably from 1,000 to 100,000, more preferably more than 1,000 and 80,000 or less, still more preferably from 1,100 to 70,000, still more preferably from 1,200 to 60,000, still more preferably from 1,300 to 50,000, still more preferably from 1,400 to 40,000, still more preferably from 1,500 to 35,000, particularly preferably from 1,700 to 32,000, most preferably from 2,000 to 30,000 because the effects of the present invention can be further expressed.

The polyols may contain a polyol (A2) having 3 or more OH groups and having a number-average molecular weight Mn of 20,000 or less. The number of kinds of the polyols (A2) may be only one, or two or more. The number-average molecular weight Mn of the polyol (A2) is preferably from 100 to 20,000, more preferably from 150 to 10,000, still more preferably from 200 to 7,500, particularly preferably from 300 to 6,000, most preferably from 300 to 5,000 because the effects of the present invention can be further expressed. Preferred examples of the polyol (A2) include a polyol having 3 OH groups (triol), a polyol having 4 OH groups (tetraol), a polyol having 5 OH groups (pentaol), and a polyol having 6 OH groups (hexaol) because the effects of the present invention can be further expressed.

The total amount of the polyol having 4 OH groups (tetraol), the polyol having 5 OH groups (pentaol), and the polyol having 6 OH groups (hexaol) each serving as the polyol (A2) is preferably 70 wt % or less, more preferably 60 wt % or less, still more preferably 40 wt % or less, particularly preferably 30 wt % or less in terms of content in the polyols because the effects of the present invention can be further expressed.

The content of the polyol (A2) in the polyols is preferably 95 wt % or less, more preferably from 0 wt % to 75 wt % because the effects of the present invention can be further expressed.

The content of a polyol having 4 or more OH groups and having a number-average molecular weight Mn of 20,000 or less serving as the polyol (A2) is preferably less than 70 wt %, more preferably 60 wt % or less, still more preferably 50 wt % or less, particularly preferably 40 wt % or less, most preferably 30 wt % or less with respect to the entirety of the polyols because the effects of the present invention can be further expressed.

[Cross-Linking Agent]

The urethane-based pressure-sensitive adhesive composition preferably contains a cross-linking agent because the effects of the present invention can be further expressed.

The urethane prepolymer and the polyol serving as base polymers may each be a component for the urethane-based pressure-sensitive adhesive composition when combined with the cross-linking agent.

The cross-linking agent to be combined with the urethane prepolymer and the polyol serving as base polymers is preferably a polyfunctional isocyanate-based cross-linking agent because the effects of the present invention can be further expressed.

Any appropriate polyfunctional isocyanate-based cross-linking agent that may be used for a urethanization reaction may be adopted as the polyfunctional isocyanate-based cross-linking agent. Examples of such polyfunctional isocyanate-based cross-linking agent include: lower aliphatic polyisocyanates, such as 1,2-ethylene diisocyanate, 1,4-butylene diisocyanate, and 1,6-hexamethylene diisocyanate; alicyclic polyisocyanates, such as cyclopentylene diisocyanate, cyclohexylene diisocyanate, isophorone diisocyanate, hydrogenated tolylene diisocyanate, and hydrogenated xylene diisocyanate; and aromatic polyisocyanates, such as 2,4-tolylene diisocyanate, 2,6-tolylene diisocyanate, 4,4'-diphenylmethane diisocyanate, and xylylene diisocyanate. Examples of the polyfunctional isocyanate-based cross-linking agent also include commercially available products, such as a trimethylolpropane/tolylene diisocyanate adduct (manufactured by Nippon Polyurethane Industry Co., Ltd., product name: "CORONATE L"), a trimethylolpropane/hexamethylene diisocyanate adduct (manufactured by Nippon Polyurethane Industry Co., Ltd., product name: "CORONATE HL"), a product available under the product name "CORONATE HX" (Nippon Polyurethane Industry Co., Ltd.), and a trimethylolpropane/xylylene diisocyanate adduct (manufactured by Mitsui Chemicals, Inc., product name: "TAKENATE 110N").

[Urethane-Based Pressure-Sensitive Adhesive Composition]

The urethane-based pressure-sensitive adhesive composition may contain any appropriate other component to the extent that the effects of the present invention are not impaired. Examples of such other component include a polymer component except the urethane-based prepolymer and the polyol, a cross-linking accelerator, a cross-linking catalyst, a silane coupling agent, a tackifier resin (e.g., a rosin derivative, a polyterpene resin, a petroleum resin, or an oil-soluble phenol), an age resistor, an inorganic filler, an organic filler, a metal powder, a colorant (e.g., a pigment or a dye), a foil-like material, a deterioration-preventing agent, a chain transfer agent, a plasticizer, a softening agent, a surfactant, an antistatic agent, a conductive agent, a stabilizer, a surface lubricant, a leveling agent, a corrosion inhibitor, a heat stabilizer, a polymerization inhibitor, a lubricant, a solvent, and a catalyst.

The urethane-based pressure-sensitive adhesive composition preferably contains a deterioration-preventing agent because the effects of the present invention can be further expressed. The number of kinds of the deterioration-preventing agents may be only one, or two or more.

Preferred examples of the deterioration-preventing agent include an antioxidant, a UV absorber, and a light stabilizer because the effects of the present invention can be further expressed.

Examples of the antioxidant include a radical chain inhibitor and a peroxide decomposer.

Examples of the radical chain inhibitor include a phenol-based antioxidant and an amine-based antioxidant.

Examples of the phenol-based antioxidant include a monophenol-based antioxidant, a bisphenol-based antioxidant, and a polymer-type phenol-based antioxidant. Examples of the monophenol-based antioxidant include 2,6-di-t-butyl-p-cresol, butylated hydroxyanisole, 2,6-di-t-butyl-4-ethylphenol, and stearin-$\beta$-(3,5-di-t-butyl-4-hydroxyphenyl)propionate. Examples of the bisphenol-based antioxidant include 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis (3-methyl-6-t-butylphenol), and 3,9-bis[1,1-dimethyl-2-[$\beta$-(3-t-butyl-4-hydroxy-5-methylphenyl)propionyloxy]ethyl] 2,4,8,10-tetraoxaspiro[5,5]undecane. Examples of the polymer-type phenol-based antioxidant include 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis-[methylene-3-(3',5'-di-t-butyl-4'-hydroxyphenyl) propionate]methane, bis[3,3'-bis-(4'-hydroxy-3'-t-butylphenyl)butyric acid] glycol ester, 1,3,5-tris(3',5'-di-t-butyl-4'-hydroxybenzyl)-S-triazine-2,4,6-(1H,3H,5H) trione, and tocopherol.

Examples of the peroxide decomposer include a sulfur-based antioxidant and a phosphorus-based antioxidant. Examples of the sulfur-based antioxidant include dilauryl 3,3'-thiodipropionate, dimyristyl 3,3'-thiodipropionate, and distearyl 3,3'-thiodipropionate. Examples of the phosphorus-based antioxidant include triphenyl phosphite, diphenyl isodecyl phosphite, and phenyl diisodecyl phosphite.

Examples of the UV absorber include a benzophenone-based UV absorber, a benzotriazole-based UV absorber, a salicylic acid-based UV absorber, an oxanilide-based UV absorber, a cyanoacrylate-based UV absorber, and a triazine-based UV absorber.

Examples of the benzophenone-based UV absorber include 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-dimethoxybenzophenone, 2,2'-dihydroxy-4,4'-dimethoxybenzophenone, 2-hydroxy-4-methoxy-5-sulfobenzophenone, and bis(2-methoxy-4-hydroxy benzoylphenyl) methane.

Examples of the benzotriazole-based UV absorber include 2-(2'-hydroxy-5'-methylphenyl)benzotriazole, 2-(2'-hydroxy-5'-tert-butylphenyl)benzotriazole, 2-(2'-hydroxy-3', 5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-amylphenyl)benzotriazole, 2-(2'-hydroxy-4'-octoxyphenyl)benzotriazole, 2-[2'-hydroxy-3'-(3",4",5",6",-tetrahydrophthalimidomethyl)-5'-methylphenyl]benzotriazole, 2,2'-methylenebis[4-(1,1,3,3-tetramethylbutyl)-6-(2H-benzotriazol-2-yl)phenol], and 2-(2'-hydroxy-5'-methacryloxyphenyl)-2H-benzotriazole.

Examples of the salicylic acid-based UV absorber include phenyl salicylate, p-tert-butylphenyl salicylate, and p-octylphenyl salicylate.

Examples of the cyanoacrylate-based UV absorber include 2-ethylhexyl-2-cyano-3,3'-diphenyl acrylate, and ethyl-2-cyano-3,3'-diphenyl acrylate.

Examples of the light stabilizer include a hindered amine-based light stabilizer and a UV stabilizer. Examples of the hindered amine-based light stabilizer include bis(2,2,6,6-tetramethyl-4-piperidyl) sebacate, bis(1,2,2,6,6-pentamethyl-4-piperidyl) sebacate, and methyl-1,2,2,6,6-pentamethyl-4-piperidyl sebacate. Examples of the UV stabilizer include nickel bis(octylphenyl) sulfide, [2,2'-thiobis(4-tert-octylphenolate)]-n-butylamine nickel, nickel complex-3,5-di-tert-butyl-4-hydroxybenzyl-phosphoric acid monoethylate, a benzoate-type quencher, and nickel-dibutyl dithiocarbamate.

[Urethane-based Polymer formed from Urethane-based Pressure-sensitive Adhesive Composition containing Urethane Prepolymer and Polyfunctional Isocyanate-based Cross-linking Agent]

The number of kinds of the urethane prepolymers may be only one, or two or more. The number of kinds of the polyfunctional isocyanate-based cross-linking agents may be only one, or two or more.

Any appropriate production method may be adopted as a method of forming the urethane-based polymer from the urethane-based pressure-sensitive adhesive composition containing the urethane prepolymer and the polyfunctional isocyanate-based cross-linking agent as long as the production method is a method of producing a urethane-based polymer through use of a so-called "urethane prepolymer" as a raw material.

The number-average molecular weight Mn of the urethane prepolymer is preferably from 3,000 to 1,000,000 because the effects of the present invention can be further expressed.

An equivalent ratio "NCO group/OH group" between an NCO group and a OH group in the urethane prepolymer and the polyfunctional isocyanate-based cross-linking agent is preferably 5.0 or less, more preferably from 0.01 to 4.75, still more preferably from 0.02 to 4.5, particularly preferably from 0.03 to 4.25, most preferably from 0.05 to 4.0 because the effects of the present invention can be further expressed.

The content of the polyfunctional isocyanate-based cross-linking agent is preferably from 0.01 part by weight to 30 parts by weight, more preferably from 0.05 part by weight to 25 parts by weight, still more preferably from 0.1 part by weight to 20 parts by weight, particularly preferably from 0.5 part by weight to 17.5 parts by weight, most preferably from 1 part by weight to 15 parts by weight with respect to 100 parts by weight of the urethane prepolymer because the effects of the present invention can be further expressed.

[Urethane-Based Polymer Formed from Urethane-Based Pressure-Sensitive Adhesive Composition Containing Polyol and Polyfunctional Isocyanate-Based Cross-Linking Agent]

The number of kinds of the polyols may be only one, or two or more. The number of kinds of the polyfunctional isocyanate-based cross-linking agents may be only one, or two or more.

An equivalent ratio "NCO group/OH group" between an NCO group and a OH group in the polyol and the polyfunctional isocyanate-based cross-linking agent is preferably 5.0 or less, more preferably from 0.1 to 3.0, still more preferably from 0.2 to 2.5, particularly preferably from 0.3 to 2.25, most preferably from 0.5 to 2.0 because the effects of the present invention can be further expressed.

The content of the polyfunctional isocyanate-based cross-linking agent is preferably from 1.0 part by weight to 30 parts by weight, more preferably from 1.5 parts by weight to 27 parts by weight, still more preferably from 2.0 parts by weight to 25 parts by weight, particularly preferably from 2.3 parts by weight to 23 parts by weight, most preferably from 2.5 parts by weight to 20 parts by weight with respect to 100 parts by weight of the polyol because the effects of the present invention can be further expressed.

Specifically, the urethane-based polymer formed from the urethane-based pressure-sensitive adhesive composition containing the polyol and the polyfunctional isocyanate-based cross-linking agent is preferably formed by curing the urethane-based pressure-sensitive adhesive composition containing the polyol and the polyfunctional isocyanate-based cross-linking agent. As a method of forming the urethane-based polymer by curing the urethane-based pressure-sensitive adhesive composition containing the polyol and the polyfunctional isocyanate-based cross-linking agent, there may be adopted any appropriate method such as a urethanization reaction method making use of, for example, bulk polymerization or solution polymerization to the extent that the effects of the present invention are not impaired.

A catalyst is preferably used for curing the urethane-based pressure-sensitive adhesive composition containing the polyol and the polyfunctional isocyanate-based cross-linking agent. Examples of such catalyst include an organometallic compound and a tertiary amine compound.

Examples of the organometallic compound may include an iron-based compound, a tin-based compound, a titanium-based compound, a zirconium-based compound, a lead-based compound, a cobalt-based compound, and a zinc-based compound. Of those, an iron-based compound and a tin-based compound are preferred from the viewpoints of a reaction rate and the pot life of the pressure-sensitive adhesive layer.

Examples of the iron-based compound include iron acetylacetonate, iron 2-ethylhexanoate, and Nacem Ferric Iron.

Examples of the tin-based compound include dibutyltin dichloride, dibutyltin oxide, dibutyltin dibromide, dibutyltin maleate, dibutyltin dilaurate, dibutyltin diacetate, dibutyltin sulfide, tributyltin methoxide, tributyltin acetate, triethyltin ethoxide, tributyltin ethoxide, dioctyltin oxide, dioctyltin dilaurate, tributyltin chloride, tributyltin trichloroacetate, and tin 2-ethylhexanoate.

Examples of the titanium-based compound include dibutyltitanium dichloride, tetrabutyl titanate, and butoxytitanium trichloride.

Examples of the zirconium-based compound include zirconium naphthenate and zirconium acetylacetonate.

Examples of the lead-based compound include lead oleate, lead 2-ethylhexanoate, lead benzoate, and lead naphthenate.

Examples of the cobalt-based compound include cobalt 2-ethylhexanoate and cobalt benzoate.

Examples of the zinc-based compound include zinc naphthenate and zinc 2-ethylhexanoate.

Examples of the tertiary amine compound include triethylamine, triethylenediamine, and 1,8-diazabicyclo-(5,4,0)-undecene-7.

The number of kinds of the catalysts may be only one, or two or more. In addition, the catalyst may be used in combination with, for example, a cross-linking retarder. The amount of the catalyst is preferably from 0.005 part by weight to 1.00 part by weight, more preferably from 0.01 part by weight to 0.75 part by weight, still more preferably from 0.01 part by weight to 0.50 part by weight, particularly preferably from 0.01 part by weight to 0.20 part by weight with respect to 100 parts by weight of the polyol because the effects of the present invention can be further expressed.

<Rubber-Based Pressure-Sensitive Adhesive>

For example, any appropriate rubber-based pressure-sensitive adhesive such as a known rubber-based pressure-sensitive adhesive described in JP 2015-074771 A or the like may be adopted as the rubber-based pressure-sensitive adhesive to the extent that the effects of the present invention are not impaired. The number of kinds thereof may be only one, or two or more. The rubber-based pressure-sensitive adhesive may contain any appropriate component to the extent that the effects of the present invention are not impaired.

<Silicone-Based Pressure-Sensitive Adhesive>

For example, any appropriate silicone-based pressure-sensitive adhesive such as a known silicone-based pressure-sensitive adhesive described in JP 2014-047280 A or the like may be adopted as the silicone-based pressure-sensitive adhesive to the extent that the effects of the present invention are not impaired. The number of kinds thereof may be only one, or two or more. The silicone-based pressure-sensitive adhesive may contain any appropriate component to the extent that the effects of the present invention are not impaired.

<<Release Film>>

The thickness of the release film is preferably from 5 μm to 250 μm because the effects of the present invention can be further expressed.

The release film may include a resin base material film.

Examples of the resin base material film include: a plastic film including a polyester-based resin, such as polyethylene terephthalate (PET), polyethylene naphthalate (PEN), or polybutylene terephthalate (PBT); a plastic film including an olefin-based resin containing an α-olefin as a monomer component, such as polyethylene (PE), polypropylene (PP), polymethylpentene (PMP), an ethylene-propylene copolymer, or an ethylene-vinyl acetate copolymer (EVA); a plastic film including polyvinyl chloride (PVC); a plastic film including a vinyl acetate-based resin; a plastic film including polycarbonate (PC); a plastic film including polyphenylene sulfide (PPS); a plastic film including an amide-based resin, such as polyamide (nylon) or wholly aromatic polyamide (aramid); a plastic film including a polyimide-based resin; a plastic film including polyether ether ketone (PEEK); a plastic film including an olefin-based resin, such as polyethylene (PE) or polypropylene (PP); and a plastic film including a fluorine-based resin, such as polytetrafluoroethylene, polychlorotrifluoroethylene, polyvinyl fluoride, polyvinylidene fluoride, a tetrafluoroethylene-hexafluoropropylene copolymer, or a chlorofluoroethylene-vinylidene fluoride copolymer.

The number of the resin base material films may be only one, or two or more. The resin base material film may be stretched.

The resin base material film may be subjected to surface treatment. Examples of the surface treatment include corona treatment, plasma treatment, chromic acid treatment, ozone exposure, flame exposure, high-voltage electric shock exposure, ionizing radiation treatment, and coating treatment with an undercoating agent.

The resin base material film may contain any appropriate additive to the extent that the effects of the present invention are not impaired.

The release film may have a release layer for increasing its peelability from the pressure-sensitive adhesive layer.

When the release film has the release layer, the release layer side thereof is directly laminated on the pressure-sensitive adhesive layer.

Any appropriate formation material may be adopted as a formation material for the release layer to the extent that the effects of the present invention are not impaired. Examples of such formation material include a silicone-based release agent, a fluorine-based release agent, a long-chain alkyl-based release agent, and a fatty acid amide-based release agent. Of those, a silicone-based release agent is preferred. The release layer may be formed as an applied layer.

Any appropriate thickness may be adopted as the thickness of the release layer depending on purposes to the extent that the effects of the present invention are not impaired. Such thickness is preferably from 10 nm to 2,000 nm.

The number of the release layers may be only one, or two or more.

As a silicone-based release layer, there is given, for example, an addition reaction-type silicone resin. Specific examples of the addition reaction-type silicone resin include: KS-774, KS-775, KS-778, KS-779H, KS-847H, and KS-847T manufactured by Shin-Etsu Chemical Co., Ltd.; TPR-6700, TPR-6710, and TPR-6721 manufactured by Toshiba Silicone Co., Ltd.; and SD7220 and SD7226 manufactured by Dow Corning Toray Co., Ltd.

The application amount of the silicone-based release layer (after its drying) is preferably from $0.01 \ g/m^2$ to $2 \ g/m^2$, more preferably from $0.01 \ g/m^2$ to $1 \ g/m^2$, still more preferably from $0.01 \ g/m^2$ to $0.5 \ g/m^2$.

The release layer may be formed by, for example, applying the above-mentioned formation material onto any appropriate layer by a hitherto known application method, such as reverse gravure coating, bar coating, or die coating, and then curing the formation material through heat treatment, which is typically performed at from about 120° C. to about 200° C. In addition, as required, the heat treatment and active energy ray irradiation such as UV irradiation may be used in combination.

EXAMPLES

The present invention is specifically described below by way of Examples. However, the present invention is by no means limited to these Examples. Test and evaluation methods in Examples and the like are as described below. The description "part(s)" means "part(s) by weight" unless otherwise specified, and the description "%" means "wt %" unless otherwise specified.

<Preparation of Pressure-Sensitive Adhesive Tapes>

Products shown in Table 1 below were prepared as pressure-sensitive adhesive tapes.

TABLE 1

| Kind | Product number | Kind of pressure-sensitive adhesive |
|---|---|---|
| "E-MASK" series (manufactured by Nitto Denko Corporation) | RP207 RP301 RP108C | Acrylic pressure-sensitive adhesive |
| "REVALPHA" series (manufactured by Nitto Denko Corporation) | No. 3195HS (N) No. 3198LS (N) No. 3196 (N) No. 3198MS (N) No. 3195MS (N) | |
| "ELEP HOLDER" series (manufactured by Nitto Denko Corporation) | NBD2170 NBD5170 | |

31

TABLE 1-continued

| Kind | Product number | Kind of pressure-sensitive adhesive |
| --- | --- | --- |
| Tape for floor protection (manufactured by Nitto Denko Corporation) | No. 395N | |
| OPP tape for wrapping (manufactured by Nitto Denko Corporation) | No. 3303EZ | |
| Surface protective film for metal plate (manufactured by Nitto Denko Corporation) | SPV-224R | |
| OPP tape for wrapping (manufactured by Nitto Denko Corporation) | No. 3040 | Rubber-based pressure-sensitive adhesive |
| NITOFLON series (manufactured by Nitto Denko Corporation) | No. 973UL | Silicone-based pressure-sensitive adhesive |
| Polyimide tape for heat-resistant insulation (manufactured by Nitto Denko Corporation) | No. 360 | adhesive |

Example 1

Potassium hydroxide (KOH) was added to 2-propanol (IPA) (HSP value=23.6) so that an alkali concentration in a treatment liquid to be obtained became 0.5 wt %. Thus, a pressure-sensitive adhesive treatment liquid (1) was obtained. Details about the treatment liquid are summarized in Table 2.

Example 2

Potassium hydroxide (KOH) was added to 2-propanol (IPA) (HSP value=23.6) so that an alkali concentration in a treatment liquid to be obtained became 5 wt %. Thus, a pressure-sensitive adhesive treatment liquid (2) was obtained. Details about the treatment liquid are summarized in Table 2.

Example 3

Potassium hydroxide (KOH) was added to 2-propanol (IPA) (HSP value=23.6) so that an alkali concentration in a treatment liquid to be obtained became 0.05 wt %. Thus, a pressure-sensitive adhesive treatment liquid (3) was obtained. Details about the treatment liquid are summarized in Table 2.

Example 4

Potassium hydroxide (KOH) was added to 2-propanol (IPA) (HSP value=23.6) so that an alkali concentration in a treatment liquid to be obtained became 0.005 wt %. Thus, a pressure-sensitive adhesive treatment liquid (4) was obtained. Details about the treatment liquid are summarized in Table 2.

Example 5

Potassium hydroxide (KOH) was added to a mixed liquid containing 2-propanol (IPA) and d-limonene at a volume ratio of 50/50 (HSP value=20.7) so that an alkali concentration in a treatment liquid to be obtained became 0.5 wt %.

32

Thus, a pressure-sensitive adhesive treatment liquid (5) was obtained. Details about the treatment liquid are summarized in Table 2.

Example 6

Potassium hydroxide (KOH) was added to a mixed liquid containing 2-propanol (IPA) and toluene at a volume ratio of 22/78 (HSP value=19.4) so that an alkali concentration in a treatment liquid to be obtained became 0.5 wt %. Thus, a pressure-sensitive adhesive treatment liquid (6) was obtained. Details about the treatment liquid are summarized in Table 2.

Example 7

A surfactant (EMULGEN A-60, manufactured by Kao Corporation) was added as an additive to 2-propanol (IPA) (HSP value=23.6), and potassium hydroxide (KOH) was added to the mixture so that an alkali concentration in a treatment liquid to be obtained became 0.5 wt %. Thus, a pressure-sensitive adhesive treatment liquid (7) was obtained. Details about the treatment liquid are summarized in Table 2.

Example 8

A surfactant (EMULGEN 105, manufactured by Kao Corporation) was added as an additive to 2-propanol (IPA) (HSP value=23.6), and potassium hydroxide (KOH) was added to the mixture so that an alkali concentration in a treatment liquid to be obtained became 0.5 wt %. Thus, a pressure-sensitive adhesive treatment liquid (8) was obtained. Details about the treatment liquid are summarized in Table 2.

Comparative Example 1

2-Propanol (IPA) (HSP value=23.6) was used as a pressure-sensitive adhesive treatment liquid (C1). Details about the treatment liquid are summarized in Table 2.

Example 9

Potassium hydroxide (KOH) was added to benzyl alcohol (HSP value=23.8) so that an alkali concentration in a treatment liquid to be obtained became 0.5 wt %. Thus, a pressure-sensitive adhesive treatment liquid (9) was obtained. Details about the treatment liquid are summarized in Table 2.

Example 10

Potassium hydroxide (KOH) was added to benzyl alcohol (HSP value=23.8) so that an alkali concentration in a treatment liquid to be obtained became 5 wt %. Thus, a pressure-sensitive adhesive treatment liquid (10) was obtained. Details about the treatment liquid are summarized in Table 2.

Example 11

Potassium hydroxide (KOH) was added to benzyl alcohol (HSP value=23.8) so that an alkali concentration in a treatment liquid to be obtained became 1 wt %. Thus, a pressure-sensitive adhesive treatment liquid (11) was obtained. Details about the treatment liquid are summarized in Table 2.

Example 12

Potassium hydroxide (KOH) was added to benzyl alcohol (HSP value=23.8) so that an alkali concentration in a treatment liquid to be obtained became 0.1 wt %. Thus, a pressure-sensitive adhesive treatment liquid (12) was obtained. Details about the treatment liquid are summarized in Table 2.

Example 13

Potassium hydroxide (KOH) was added to ethanol (HSP value=26.5) so that an alkali concentration in a treatment liquid to be obtained became 0.5 wt %. Thus, a pressure-sensitive adhesive treatment liquid (13) was obtained. Details about the treatment liquid are summarized in Table 2.

Example 14

Potassium hydroxide (KOH) was added to a mixed liquid containing ethanol and water at a volume ratio of 80/20 (HSP value=30.8) so that an alkali concentration in a treatment liquid to be obtained became 1 wt %. Thus, a pressure-sensitive adhesive treatment liquid (13) was obtained. Details about the treatment liquid are summarized in Table 2.

Comparative Example 2

Potassium hydroxide (KOH) was added to a mixed liquid containing ethanol and water at a volume ratio of 65/35 (HSP value=34.0) so that an alkali concentration in a treatment liquid to be obtained became 0.5 wt %. Thus, a pressure-sensitive adhesive treatment liquid (C2) was obtained. Details about the treatment liquid are summarized in Table 2.

Example 15

Potassium hydroxide (KOH) was added to 1-butanol (HSP value=23.2) so that an alkali concentration in a treatment liquid to be obtained became 0.5 wt %. Thus, a pressure-sensitive adhesive treatment liquid (15) was obtained. Details about the treatment liquid are summarized in Table 2.

Comparative Example 3

Potassium hydroxide (KOH) was added to water (HSP value=47.8) so that an alkali concentration in a treatment liquid to be obtained became 0.5 wt %. Thus, a pressure-sensitive adhesive treatment liquid (C3) was obtained. Details about the treatment liquid are summarized in Table 2.

Comparative Example 4

Potassium hydroxide (KOH) was added to water (HSP value=47.8) so that an alkali concentration in a treatment liquid to be obtained became 5 wt %. Thus, a pressure-sensitive adhesive treatment liquid (C4) was obtained. Details about the treatment liquid are summarized in Table 2.

Comparative Example 5

Water (HSP value=47.8) was used as a pressure-sensitive adhesive treatment liquid (C5). Details about the treatment liquid are summarized in Table 2.

Example 16

Potassium hydroxide (KOH) was added to a mixed solvent containing cyclopentyl methyl ether (Cpme) and methanol at a volume ratio of 70/30 (HSP value=20.0) so that an alkali concentration in a treatment liquid to be obtained became 1.3 wt %. Thus, a pressure-sensitive adhesive treatment liquid (16) was obtained. Details about the treatment liquid are summarized in Table 2.

Example 17

Potassium hydroxide (KOH) was added to a mixed solvent containing cyclopentyl methyl ether (Cpme) and ethanol at a volume ratio of 70/30 (HSP value=19.5) so that an alkali concentration in a treatment liquid to be obtained became 1.3 wt %. Thus, a pressure-sensitive adhesive treatment liquid (17) was obtained. Details about the treatment liquid are summarized in Table 2.

Example 18

Potassium hydroxide (KOH) was added to a mixed solvent containing cyclopentyl methyl ether (Cpme) and 2-propanol (IPA) at a volume ratio of 70/30 (HSP value=18.9) so that an alkali concentration in a treatment liquid to be obtained became 1.3 wt %. Thus, a pressure-sensitive adhesive treatment liquid (18) was obtained. Details about the treatment liquid are summarized in Table 2.

Example 19

Potassium hydroxide (KOH) was added to a mixed solvent containing cyclopentyl methyl ether (Cpme) and 1-butanol at a volume ratio of 70/30 (HSP value=18.8) so that an alkali concentration in a treatment liquid to be obtained became 1.3 wt %. Thus, a pressure-sensitive adhesive treatment liquid (19) was obtained. Details about the treatment liquid are summarized in Table 2.

Example 20

Potassium hydroxide (KOH) was added to a mixed solvent containing cyclopentyl methyl ether (Cpme) and benzyl alcohol at a volume ratio of 70/30 (HSP value=18.7) so that an alkali concentration in a treatment liquid to be obtained became 1.3 wt %. Thus, a pressure-sensitive adhesive treatment liquid (20) was obtained. Details about the treatment liquid are summarized in Table 2.

Example 21

Potassium hydroxide (KOH) was added to a mixed solvent containing toluene and methanol at a volume ratio of 80/20 (HSP value=18.7) so that an alkali concentration in a treatment liquid to be obtained became 1.0 wt %. Thus, a pressure-sensitive adhesive treatment liquid (21) was obtained. Details about the treatment liquid are summarized in Table 2.

Example 22

Potassium hydroxide (KOH) was added to a mixed solvent containing toluene and 1-butanol at a volume ratio of 80/20 (HSP value=18.4) so that an alkali concentration in a treatment liquid to be obtained became 1.0 wt %. Thus, a pressure-sensitive adhesive treatment liquid (22) was obtained. Details about the treatment liquid are summarized in Table 2.

Example 23

Sodium ethoxide (NaOEt) was added to a mixed solvent containing ethanol and 1-butanol at a volume ratio of 50/50 (HSP value=24.8) so that an alkali concentration in a treatment liquid to be obtained became 5.0 wt %. Thus, a pressure-sensitive adhesive treatment liquid (23) was obtained. Details about the treatment liquid are summarized in Table 2.

Example 24

Sodium ethoxide (NaOEt) was added to ethanol (HSP value=26.5) so that an alkali concentration in a treatment liquid to be obtained became 20.0 wt %. Thus, a pressure-sensitive adhesive treatment liquid (24) was obtained. Details about the treatment liquid are summarized in Table 2.

Example 25

Potassium hydroxide (KOH) was added to 1-butanol (HSP value=23.2) so that an alkali concentration in a treatment liquid to be obtained became 10.0 wt %. Thus, a pressure-sensitive adhesive treatment liquid (25) was obtained. Details about the treatment liquid are summarized in Table 2.

TABLE 2

| Pressure-sensitive adhesive treatment liquid | Liquid in pressure-sensitive adhesive treatment liquid | | Alkali | |
|---|---|---|---|---|
| | Kind | HSP value | | concentration (wt %) |
| (1) | IPA | 23.6 | KOH | 0.5 |
| (2) | IPA | 23.6 | | 5 |
| (3) | IPA | 23.6 | | 0.05 |
| (4) | IPA | 23.6 | | 0.005 |
| (5) | IPA/d-limonene = 50/50 (volume ratio) | 20.7 | | 0.5 |
| (6) | IPA/toluene = 22/78 | 19.4 | | 0.5 |
| (7) | IPA + EMULGEN A-60 serving as additive | 23.6 | | 0.5 |
| (8) | IPA + EMULGEN 105 serving as additive | 23.6 | | 0.5 |
| (C1) | IPA | 23.6 | — | 0 |
| (9) | Benzyl alcohol | 23.8 | KOH | 0.5 |
| (10) | Benzyl alcohol | 23.8 | | 5 |

TABLE 2-continued

| Pressure-sensitive adhesive treatment liquid | Liquid in pressure-sensitive adhesive treatment liquid | | Alkali | |
|---|---|---|---|---|
| | Kind | HSP value | | concentration (wt %) |
| (11) | Benzyl alcohol | 23.8 | | 1 |
| (12) | Benzyl alcohol | 23.8 | | 0.1 |
| (13) | Ethanol | 26.5 | | 0.5 |
| (14) | Ethanol/water = 80/20 (volume ratio) | 30.5 | | 1 |
| (C2) | Ethanol/water = 65/35 (volume ratio) | 34.0 | | 0.5 |
| (15) | 1-Butanol | 23.2 | | 0.5 |
| (C3) | Water | 47.8 | | 0.5 |
| (C4) | Water | 47.8 | | 5 |
| (C5) | Water | 47.8 | — | 0 |
| (16) | Cpme/methanol = 70/30 (volume ratio) | 20.0 | KOH | 1.3 |
| (17) | Cpme/ethanol = 70/30 (volume ratio) | 19.5 | | 1.3 |
| (18) | Cpme/IPA = 70/30 | 18.9 | | 1.3 |
| (19) | Cpme/1-butanol = 70/30 (volume ratio) | 18.8 | | 1.3 |
| (20) | Cpme/benzyl alcohol = 70/30 (volume ratio) | 18.7 | | 1.3 |
| (21) | Toluene/methanol = 80/20 (volume ratio) | 18.7 | | 1.0 |
| (22) | Toluene/1-butanol = 80/20 (volume ratio) | 18.4 | | 1.0 |
| (23) | Ethanol/1-butanol = 50/50 (volume ratio) | 24.8 | NaOEt | 5.0 |
| (24) | Ethanol | 26.5 | NaOEt | 20.0 |
| (25) | 1-Butanol | 23.2 | KOH | 10.0 |

[Evaluation Test 1]

Each of the pressure-sensitive adhesive tapes was cut into a size measuring 3 cm by 3 cm and used as a test piece. When a separator was arranged on the pressure-sensitive adhesion surface of the pressure-sensitive adhesive layer of the tape, the separator was peeled and removed, and the resultant separator-less pressure-sensitive adhesive tape was used as a test piece. The test piece was impregnated with each of the pressure-sensitive adhesive treatment liquids in a vial bottle, and was left to stand still at 60° C. for "t" minutes. After that, the test piece was removed, and was left to stand still in water at 25° C. for 60 seconds. After that, the pressure-sensitive adhesive layer was rubbed with a fingertip, and whether or not the pressure-sensitive adhesive layer was separated from the base material of the tape was recognized.

An evaluation was performed on the basis of the following criteria. The results are shown in Table 3.

⊚: In the test piece, the pressure-sensitive adhesive layer was separated from the base material at t=1 (i.e., after still standing for 1 minute).

○: In the test piece, the pressure-sensitive adhesive layer was separated from the base material at 1<t≤10 (i.e., after still standing for more than 1 minute and 10 minutes or less).

Δ: In the test piece, the pressure-sensitive adhesive layer was separated from the base material at 10<t<100 (i.e., after still standing for more than 10 minutes and less than 100 minutes).

x: In the test piece, the pressure-sensitive adhesive layer was not separated from the base material even at t=100 (i.e., after still standing for 100 minutes).

TABLE 3

Pressure-sensitive adhesive treatment liquid

| Product | | | (1) | (2) | (3) | (4) IPA-based liquid | (5) IPA-based liquid | (6) IPA-based liquid | (7) | (8) | (9) | (10) Benzyl alcohol | (11) Benzyl alcohol | (12) Benzyl alcohol | (13) Ethanol-based liquid | (14) Ethanol-based liquid | (15) 1-Butanol | (23) Ethanol-based liquid | (24) Ethanol-based liquid | (25) 1-Butanol | (C1) IPA | (C2) Ethanol-based liquid | (C3) Water | (C4) Water | (C5) |
|---|---|---|---|---|---|---|---|---|---|---|---|---|---|---|---|---|---|---|---|---|---|---|---|---|---|
| HSP value | | | 23.6 | 23.6 | 23.6 | 23.6 | 20.7 | 19.4 | 23.6 | 23.6 | 23.8 | 23.8 | 23.8 | 23.8 | 26.5 | 30.8 | 23.2 | 24.8 | 26.5 | 23.2 | 23.6 | 34.6 | 47.8 | 47.8 | 47.8 |
| Alkali | | | KOH | KOH | KOH | KOH | KOH | KOH | KOH | KOH | KOH | KOH | KOH | KOH | KOH | KOH | KOH | NaOEt | NaOEt | KOH | — | KOH | KOH | KOH | — |
| Alkali concentration (wt%) | | | 0.5 | 5 | 0.05 | 0.005 | 0.5 | 0.5 | 0.5 | 0.5 | 0.5 | 5 | 1 | 0.1 | 0.5 | 1 | 0.5 | 5.0 | 20.0 | 10.0 | 0 | 0.5 | 0.5 | 5 | 0 |
| E-MASK | RP207 | Acrylic pressure sensitive adhesive | ◎ | ◎ | ○ | △ | ◎ | ◎ | ○ | ○ | ◎ | ◎ | ◎ | ○ | ◎ | ○ | ◎ | ◎ | ◎ | ◎ | X | X | X | X | X |
| | RP301 | | ◎ | — | — | — | — | — | — | — | ◎ | — | — | — | — | — | — | — | — | — | — | — | — | — | — |
| | RP108C | | ◎ | — | — | — | — | ◎ | — | — | ◎ | — | — | — | — | — | — | — | — | — | — | — | — | — | — |
| REVALPHA | No. 3195HS (N) | | ◎ | — | — | — | — | — | — | — | ◎ | — | — | — | — | — | — | — | — | — | — | — | — | — | — |
| | No. 3198LS (N) | | ◎ | — | — | — | — | — | — | — | ◎ | — | — | — | — | — | — | — | — | — | — | — | — | — | — |
| | No. 3196 (N) | | ◎ | — | — | — | — | ◎ | — | — | ◎ | — | — | — | — | — | — | — | — | — | — | — | — | — | — |
| | No. 3198MS (N) | | ◎ | — | — | — | — | — | — | — | ◎ | — | — | — | — | — | — | — | — | — | — | — | — | — | — |
| | No. 3195MS (N) | | ◎ | — | — | — | — | — | — | — | ◎ | — | — | — | — | — | — | — | — | — | — | — | — | — | — |
| ELEP HOLDER | NBD2170 | | ◎ | — | — | — | — | ◎ | — | — | ◎ | — | — | — | — | — | — | — | — | — | — | — | — | — | — |
| | NBD5170 | | ◎ | — | — | — | — | ◎ | — | — | ◎ | — | — | — | — | — | ○ | — | — | — | — | — | — | — | — |
| Tape for floor protection | No. 395N | | ◎ | — | — | — | — | — | — | — | ◎ | — | — | — | — | — | — | — | — | — | — | — | — | — | — |
| OPP tape for wrapping | No. 3303EZ | | ◎ | — | — | — | — | ◎ | — | — | ◎ | — | — | — | — | — | — | — | — | — | — | — | — | — | — |
| Surface protective film for metal plate | SPV-224R | | ○ | — | — | — | — | ◎ | — | — | ○ | — | — | — | — | — | ○ | — | — | — | — | — | — | — | — |

TABLE 3-continued

| | | | Pressure-sensitive adhesive treatment liquid | | | | | | | | | | | | | | | | | | | | | | |
|---|---|---|---|---|---|---|---|---|---|---|---|---|---|---|---|---|---|---|---|---|---|---|---|---|---|---|
| | | | (1) | (2) | (3) | (4) | (5) | (6) | (7) | (8) | (9) | (10) | (11) | (12) | (13) | (14) | (15) | (23) | (24) | (25) | (C1) | (C2) | (C3) | (C4) | (C5) |
| | | | IPA-based liquid | | | | | | | | | Benzyl alcohol | | | Ethanol-based liquid | | 1-Butanol | Ethanol-based liquid | | 1-Butanol | IPA | Ethanol-based liquid | | Water | |
| HSP value | | | 23.6 | 23.6 | 23.6 | 23.6 | 20.7 | 19.4 | 23.6 | 23.6 | 23.8 | 23.8 | 23.8 | 23.8 | 26.5 | 30.8 | 23.2 | 24.8 | 26.5 | 23.2 | 23.6 | 34.6 | 47.8 | 47.8 | 47.8 |
| Alkali concentration (wt %) | | | 0.5 | 5 | 0.05 | 0.005 | 0.5 | 0.5 | 0.5 | 0.5 | 0.5 | 5 | 1 | 0.1 | 0.5 | 1 | 0.5 | 5.0 | 20.0 | 10.0 | 0 | 0.5 | 0.5 | 5 | 0 |
| | | | KOH | | | | | | | | | | | | | | | NaOEt | | KOH | | | KOH | | |
| OPP tape for wrapping | No. 3040 | Rubber-based pressure-sensitive adhesive | — | — | — | — | — | ○ | — | — | — | — | — | — | — | — | ○ | — | — | — | — | — | — | X | X |
| NITOFLON series | No. 973UL | Silicone-based pressure sensitive adhesive | — | — | — | — | — | ○ | — | — | — | — | — | — | — | — | ○ | — | — | — | — | — | — | X | X |
| Polyimide tape for heat-resistant insulation | No. 360 | pressure sensitive adhesive | — | — | — | — | — | ○ | — | — | — | — | — | — | — | — | ○ | — | — | — | — | — | — | X | X |

[Evaluation Test 2]

RP207 serving as a pressure-sensitive adhesive tape was cut into a size measuring 3 cm by 3 cm to provide a pressure-sensitive adhesive tape with a separator (RP207—with separator), which had a separator arranged on the pressure-sensitive adhesion surface of its pressure-sensitive adhesive layer, and a separator-less pressure-sensitive adhesive tape (RP207—without separator), which was obtained by peeling and removing the separator from the pressure-sensitive adhesion surface of the pressure-sensitive adhesive layer.

Each of the pressure-sensitive adhesive tape with a separator (RP207—with separator) and the separator-less pressure-sensitive adhesive tape (RP207—without separator) was impregnated with the pressure-sensitive adhesive treatment liquid (1) obtained in Example 1 in a vial bottle, and was subjected to each of the following experiments: an experiment in which the tape was left to stand still at 65° C. for 1 minute (experiment 1); an experiment in which the tape was stirred with a vortex mixer (VTX-3000L) at 65° C. for 1 minute (experiment 2); and an experiment in which the tape was subjected to ultrasonic treatment with an ultrasonic cleaning machine (VS-F100) at 65° C. for 1 minute (experiment 3). After that, the test piece was removed, and was left to stand still in water at 25° C. for 60 seconds. After that, the pressure-sensitive adhesive layer was rubbed with a fingertip, and whether or not the pressure-sensitive adhesive layer was separated from the base material of the tape was recognized.

An evaluation was performed on the basis of the following criteria. The results are shown in Table 4.

○: In the test piece, the pressure-sensitive adhesive layer was separated from the base material.

x: In the test piece, the pressure-sensitive adhesive layer was not separated from the base material.

TABLE 4

|  | Experiment 1 Still standing | Experiment 2 Stirring | Experiment 3 Ultrasonic treatment |
|---|---|---|---|
| RP207-without separator | ○ | ○ | ○ |
| RP207-with separator | x | ○ | ○ |

[Evaluation Test 3]

"REVALPHA" No. 3195MS (N) serving as a pressure-sensitive adhesive tape was cut into a size measuring 3 cm by 3 cm to provide a separator-less pressure-sensitive adhesive tape (No. 3195MS (N)—without separator), which was obtained by peeling and removing a separator from the pressure-sensitive adhesion surface of its pressure-sensitive adhesive layer.

The No. 3195MS (N)—without separator was loaded into a vial bottle, and was impregnated with the pressure-sensitive adhesive treatment liquid (16) obtained in Example 16, followed by still standing for 10 minutes.

As a result, the pressure-sensitive adhesive of the tape was completely dissolved, and hence only the PET base material thereof was able to be recovered.

[Evaluation Test 4]

"REVALPHA" No. 3195MS (N) serving as a pressure-sensitive adhesive tape was cut into a size measuring 3 cm by 3 cm to provide a separator-less pressure-sensitive adhesive tape (No. 3195MS (N)—without separator), which was obtained by peeling and removing a separator from the pressure-sensitive adhesion surface of its pressure-sensitive adhesive layer.

The separator-less pressure-sensitive adhesive tape (No. 3195MS (N)—without separator) was impregnated with the pressure-sensitive adhesive treatment liquid (2) obtained in Example 2 in a vial bottle, followed by still standing at 65° C. for 10 minutes.

After that, the test piece was removed, and was immersed in a toluene solution at 65° C., followed by stirring with a vortex mixer (VTX-3000L) for 10 minutes.

As a result, the pressure-sensitive adhesive of the tape was completely dissolved, and hence only the PET base material thereof was able to be recovered.

[Evaluation Test 5]

The pressure-sensitive adhesive of each of the pressure-sensitive adhesive tapes was impregnated with the pressure-sensitive adhesive treatment liquid (15) obtained in Example 15, and then the pressure-sensitive adhesive was isolated. The isolated pressure-sensitive adhesive was washed with a large amount of methanol, and was then dried at 100° C. for 1 hour.

0.1 Gram of the isolated pressure-sensitive adhesive was loaded into a vial bottle, and 10 g of the pressure-sensitive adhesive treatment liquid was added thereto, followed by stirring at 50° C. for 12 hours at a stirring speed of 600 rpm. After that, the solvent of the mixture was removed by an evaporation method. Thus, a polymer was obtained. A large amount of water was added to the resultant polymer, and its solubility in water was evaluated.

○: The polymer was completely dissolved in water.

Δ: Most of the polymer was dissolved in water, but some amount of a dissolution residue was present.

x: The polymer was not dissolved in water.

TABLE 5

| | | | Pressure-sensitive adhesive treatment liquid | | | | | | | | | | | | | (13) | (14) Ethanol- |
|---|---|---|---|---|---|---|---|---|---|---|---|---|---|---|---|---|---|
| | | | (1) | (2) | (3) | (4) | (5) | (6) | (7) | (8) | (9) | (10) | (11) | (12) | | based |
| | | | | | | IPA-based liquid | | | | | | Benzyl alcohol | | | | liquid |
| | | | | | | | | | | HSP value | | | | | | |
| | | | 23.6 | 23.6 | 23.6 | 23.6 | 20.7 | 19.4 | 23.6 | 23.6 | 23.8 | 23.8 | 23.8 | 23.8 | 26.5 | 30.8 |
| | | | | | | | | Alkali concentration (wt %) | | | | | | | | | |
| | | | | | | | | KOH | | | | | | | | | |
| | | | 0.5 | 5 | 0.05 | 0.005 | 0.5 | 0.5 | 0.5 | 0.5 | 0.5 | 5 | 1 | 0.1 | 0.5 | 1 |
| E-MASK | RP207 | Acrylic | ○ | — | — | — | — | ○ | — | — | ○ | — | — | — | — | — |
| | RP301 | pressure- | — | — | — | — | — | — | — | — | — | — | — | — | — | — |
| | RP108C | sensitive | ○ | — | — | — | — | ○ | — | — | ○ | — | — | — | — | — |

TABLE 5-continued

| | | | | | | | | | | | | | | | | |
|---|---|---|---|---|---|---|---|---|---|---|---|---|---|---|---|---|
| REVALPHA | No. 3195HS (N) | adhesive | — | — | — | — | — | — | — | — | — | — | — | — | — | — |
| | No. 3198LS (N) | | — | — | — | — | — | — | — | — | — | — | — | — | — | — |
| | No. 3196 (N) | | — | — | — | — | — | — | — | — | — | — | — | — | — | — |
| | No. 3198MS (N) | | — | — | — | — | — | — | — | — | — | — | — | — | — | — |
| | No. 3195MS (N) | | ○ | — | — | — | — | ○ | — | — | ○ | — | — | — | — | — |
| NITOFLON | No. 973UL | Silicone-based pressure-sensitive adhesive | ○ | — | — | — | — | ○ | — | — | ○ | — | — | — | — | — |

| | | | Pressure-sensitive adhesive treatment liquid | | | | | | | | | | | | | |
|---|---|---|---|---|---|---|---|---|---|---|---|---|---|---|---|---|
| | | | (15) 1-Butanol | (16) | (17) | (18) | (19) | (20) | (21) Toluene/ alcohol mixed liquid | (22) | (23) Alcohol mixed liquid | (C1) IPA | (C2) Ethanol-based liquid | (C3) | (C4) Water | (C5) |
| | | | | | Cpme/alcohol mixed liquid | | | | | | | | | | | |
| | | | | | | | | | HSP value | | | | | | | |
| | | | 23.2 | 20.0 | 19.5 | 18.9 | 18.8 | 18.7 | 18.7 | 18.4 | 24.8 | 23.6 | 34.6 | 47.8 | 47.8 | 47.8 |
| | | | | | | | | | Alkali concentration (wt %) | | | | | | | |
| | | | KOH | | | | | | | | NaOEt | — | | KOH | | |
| | | | 0.5 | 1.3 | 1.3 | 1.3 | 1.3 | 1.3 | 1.3 | 1.3 | 5 | 0 | 0.5 | 0.5 | 5 | 0 |
| E-MASK | RP207 | Acrylic pressure-sensitive adhesive | ○ | ○ | — | — | — | — | — | — | — | X | — | X | X | X |
| | RP301 | | — | — | — | — | — | — | — | — | — | X | — | X | X | X |
| | RP108C | | ○ | ○ | ○ | ○ | ○ | ○ | ○ | ○ | ○ | X | — | X | X | X |
| REVALPHA | No. 3195HS (N) | adhesive | — | — | — | — | — | — | — | — | — | — | — | — | — | — |
| | No. 3198LS (N) | | — | — | — | — | — | — | — | — | — | — | — | — | — | — |
| | No. 3196 (N) | | — | — | — | — | — | — | — | — | — | — | — | — | — | — |
| | No. 3198MS (N) | | — | — | — | — | — | — | — | — | — | — | — | — | — | — |
| | No. 3195MS (N) | | ○ | ○ | — | — | — | — | — | — | — | X | — | X | X | X |
| NITOFLON | No. 973UL | Silicone-based pressure-sensitive adhesive | ○ | ○ | — | — | — | — | — | — | — | X | — | X | X | X |

INDUSTRIAL APPLICABILITY

The pressure-sensitive adhesive treatment liquid according to the embodiment of the present invention, or the pressure-sensitive adhesive treatment method according to the embodiment of the present invention may be effectively used for easily removing various kinds of pressure-sensitive adhesives. Accordingly, the treatment liquid or the method may be suitably utilized in, for example, the recycling of pressure-sensitive adhesive tape waste to be produced in a large amount in a production site or the like. In addition, in, for example, the case where a pressure-sensitive adhesive tape is used as a process material, at the time of the peeling of the pressure-sensitive adhesive tape from an adherend having bonded thereto the pressure-sensitive adhesive tape, the treatment liquid or the method may be suitably utilized for simply removing a pressure-sensitive adhesive in the pressure-sensitive adhesive tape present as an adhesive residue on the adherend without damaging the adherend. In addition, the treatment liquid or the method may be suitably utilized for easily removing a pressure-sensitive adhesive adhering to a production device, such as a polymerization kettle, an application machine, or an application roll, in, for example, a polymerization step or an application step at the time of the production of the pressure-sensitive adhesive.

REFERENCE SIGNS LIST

Pressure-sensitive adhesive tape 100

Base material layer 10

Pressure-sensitive adhesive layer 20

Release film 30

45

The invention claimed is:

1. A method of treating a pressure-sensitive adhesive with a pressure-sensitive adhesive treatment liquid, which is a treatment liquid for a pressure-sensitive adhesive, the method comprising impregnating the pressure-sensitive adhesive with the pressure-sensitive adhesive treatment liquid, wherein the pressure-sensitive adhesive treatment liquid comprises:

a liquid having a Hansen solubility parameter value of 31 or less; and an alkaline compound, wherein a concentration of the alkaline compound in the treatment liquid is from 0.001 wt % to 20 wt %.

2. The pressure-sensitive adhesive treatment method according to claim 1, further comprising performing stirring under a state in which the pressure-sensitive adhesive is impregnated with the pressure-sensitive adhesive treatment liquid.

3. The pressure-sensitive adhesive treatment method according to claim 1, further comprising performing ultrasonic treatment under a state in which the pressure-sensitive adhesive is impregnated with the pressure-sensitive adhesive treatment liquid.

4. The pressure-sensitive adhesive treatment method according to claim 1, wherein the Hansen solubility parameter value is 28 or less.

5. The pressure-sensitive adhesive treatment method according to claim 4, wherein the Hansen solubility parameter value is 25 or less.

6. The pressure-sensitive adhesive treatment method according to claim 1, wherein the concentration of the alkaline compound is from 0.001 wt % to 10 wt %.

7. The pressure-sensitive adhesive treatment method according to claim 6, wherein the concentration of the alkaline compound is from 0.01 wt % to 5 wt %.

8. The pressure-sensitive adhesive treatment method according to claim 7, wherein the concentration of the alkaline compound is from 0.1 wt % to 1 wt %.

9. The pressure-sensitive adhesive treatment method according to claim 1, wherein the pressure-sensitive adhesive includes at least one kind selected from the group consisting of: an acrylic pressure-sensitive adhesive; a urethane-based pressure-sensitive adhesive; a rubber-based pressure-sensitive adhesive; and a silicone-based pressure-sensitive adhesive.

* * * * *